US009769132B2

(12) United States Patent
Katsuta

(10) Patent No.: US 9,769,132 B2
(45) Date of Patent: Sep. 19, 2017

(54) CONTROL SYSTEM FOR SECURELY PROTECTING A CONTROL PROGRAM WHEN EDITING, EXECUTING AND TRANSMITTING THE CONTROL PROGRAM

(71) Applicant: Takao Katsuta, Tokyo (JP)

(72) Inventor: Takao Katsuta, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 111 days.

(21) Appl. No.: 14/427,695

(22) PCT Filed: Dec. 20, 2012

(86) PCT No.: PCT/JP2012/083052
§ 371 (c)(1),
(2) Date: Mar. 12, 2015

(87) PCT Pub. No.: WO2014/097444
PCT Pub. Date: Jun. 26, 2014

(65) Prior Publication Data
US 2015/0271161 A1 Sep. 24, 2015

(51) Int. Cl.
*H04L 29/06* (2006.01)
*G06F 21/12* (2013.01)
*G05B 19/05* (2006.01)

(52) U.S. Cl.
CPC ........ *H04L 63/061* (2013.01); *H04L 63/0428* (2013.01); *H04L 63/06* (2013.01);
(Continued)

(58) Field of Classification Search
None
See application file for complete search history.

(56) References Cited

U.S. PATENT DOCUMENTS

2007/0283423 A1* 12/2007 Bradley ............. G06Q 20/1235
726/4
2010/0228981 A1* 9/2010 Yao ........................ H04L 63/062
713/171
(Continued)

FOREIGN PATENT DOCUMENTS

JP 11-024997 1/1999
JP 2004-158025 A 6/2004
(Continued)

OTHER PUBLICATIONS

International Search Report issued Jan. 29, 2013 in PCT/JP2012/083052 filed Dec. 20, 2012.

*Primary Examiner* — Malcolm Cribbs
(74) *Attorney, Agent, or Firm* — Oblon, McClelland, Maier & Neustadt, L.L.P.

(57) ABSTRACT

A control system which protects a control program securely and improves a convenience for a particular user in reading and writing an execution-use control program from and into a PLC. The control system includes: a controller which controls a production apparatus; a development-use computer which converts a control program that describes control of the production apparatus, into the execution-use control program that can be executed by the controller, and encrypts the execution-use control program converted, thus generating an edit-use key for editing and an execution-use key for execution; and a management server which manages information on the user. The development-use computer registers the edit-use key in a user management table of the management server, and transmits the execution-use key and the execution-use control program to the controller.

8 Claims, 21 Drawing Sheets

(52) U.S. Cl.
CPC .............. *H04L 63/08* (2013.01); *G05B 19/05* (2013.01); *G05B 2219/24167* (2013.01); *G06F 21/12* (2013.01)

(56) References Cited

U.S. PATENT DOCUMENTS

| | | | |
|---|---|---|---|
| 2011/0023126 A1* | 1/2011 | Hayami | G06F 21/10 726/26 |
| 2013/0124853 A1* | 5/2013 | Sorotokin | G06F 21/6209 713/153 |

FOREIGN PATENT DOCUMENTS

| | | |
|---|---|---|
| JP | 2004-280653 A | 10/2004 |
| JP | 2005-286402 A | 10/2005 |
| JP | 2006-331130 A | 12/2006 |
| JP | 2008-65678 A | 3/2008 |
| JP | 2008-67162 A | 3/2008 |
| JP | 2008-83833 A | 4/2008 |
| JP | 2008-123147 A | 5/2008 |
| JP | 2011-86240 A | 4/2011 |
| JP | 2011-165041 A | 8/2011 |
| JP | 2012-113731 A | 6/2012 |

\* cited by examiner

CONTROL SYSTEM FOR SECURELY PROTECTING A CONTROL PROGRAM WHEN EDITING, EXECUTING AND TRANSMITTING THE CONTROL PROGRAM

TECHNICAL FIELD

The present invention relates to a control system, a program transmission device, an authentication server, a program protection method, and a program transmission method.

BACKGROUND ART

In a factory automation (FA) system, a controller for controlling the operation of the production facilities in the factory is disposed. This controller is called a programmable logic controller (PLC). A control program for operating the PLC is designed using a language such as ladder language. The designed control program is converted into an execution-use control program using a ladder program development environment and written in the PLC via a communication cable. A device that develops the control program and writes the control program into the PLC in this manner is called a development-use computer.

The ladder program development environment is widely marketed as software that operates on Windows (trademark). With a computer on which Windows (trademark) runs and the ladder program development environment, the execution-use control program can be written into and read from the PLC easily using the computer. In recent years, however, a problem arises in that an execution-use control program is extracted from a PLC having operated in a factory and the extracted program is imitated to create a PLC for controlling the operation of another production facility.

In order to cope with this problem, various countermeasures have been taken in the FA system so that creation of a pirated copy is prevented. As a specific example, Patent Literature 1 presents a technique in which, when writing an execution-use control program for a control program into a PLC, a development-use computer encrypts the execution-use control program and transfers the encrypted execution-use control program to the PLC. When executing the control program, the PLC analyzes an encryption rule generated in advance and extracts information specific to a control apparatus registered in the development-use computer. Based on the extracted information specific to the control apparatus, the PLC checks whether or not the execution-use control program is a program that is specific to the control apparatus (PLC). If the execution-use control program is the specific program, the execution-use control program is decrypted by the PLC. Data in the PLC is protected in this manner.

CITATION LIST

Patent Literature

Patent Literature 1: JP 2008-65678

SUMMARY OF INVENTION

Technical Problem

In the method described in Patent Literature 1, the development-use computer manages information necessary for encrypting and decrypting the execution-use control program. Hence, once the development-use computer is stolen, a third party will be able to obtain easily a key necessary for decrypting the execution-use control program. As a result, the execution-use control program cannot be protected.

When building and operating an FA system, the company in charge of development and design of a control program for a PLC and the company in charge of maintenance are often different. In this circumstance, a key necessary for decrypting an execution-use control program is generated by the computer of the company that developed the execution-use control program of the PLC. Developed products including the key are managed in the company as confidential information. If the development/design company and the maintenance company are different, data transfer between the companies is not easy due to security control. The maintenance company thus cannot obtain the key necessary for decrypting the control program for the PLC. Therefore, with the method indicated in Patent Literature 1, the computer of the maintenance company cannot view the control program.

Also, with the method indicated in Patent Literature 1, the execution-use control program and information necessary for encryption and decryption of the execution-use control program are exchanged between the development-use personal computer and the control apparatus that are constantly connected to a network. Accordingly, in the method indicated in Patent Literature 1, a large amount of data is transferred on the network. If the method indicated in Patent Literature 1 is applied to an environment where the network quality is poor, timeout and communication line fault occur frequently, and the transfer failure of the execution-use control program will occur easily.

As a means for solving these problems, a following method may be possible. The computer of the company that developed the execution-use control program generates the key necessary for decrypting the execution-use control program. The generated key is recorded in a separate medium (such as a USB memory), and the medium is sent from the company that developed the execution-use control program to the company that maintains the medium. The company in charge of the maintenance of the execution-use control program can view the control program with its computer using the key recorded in the medium. Even with this method, however, in case the medium is stolen, the key necessary for decrypting the execution-use control program leaks. As a result, the problem that the control program cannot be protected remains unsolved.

The present invention has been made to solve the problems described above, and has as its object to facilitate reading and writing of an execution-use control program by a particular user from and into a PLC, and to prevent a key necessary for viewing and editing the execution-use control program from leaking to a third party other than the particular user.

Solution to Problem

In a control system comprising: a control device which executes control of an apparatus; a program transmission device which converts a source program that describes the control of the apparatus to be executed by the control device, into an execution-use program that can be executed by the control device, encrypts the execution-use program converted, thus generating an encrypted execution-use program, and transmits the encrypted execution-use program generated, to the control device; and an authentication server, the program transmission device includes:

a transmission-side acquisition part which acquires an apparatus identifier that identifies the control device; and a transmission-side communication part which transmits an edit-use key and an apparatus identifier to the authentication server, and transmits an execution-use key and the encrypted execution-use program to the control device, the edit-use key being used when decrypting the encrypted execution-use program into the execution-use program and converting the execution-use program decrypted, into the source program, the apparatus identifier being acquired by the transmission-side acquisition part, the execution-use key being used when decrypting the encrypted execution-use program into the execution-use program, the authentication server receives the edit-use key and the apparatus identifier from the transmission-side communication part, and stores the edit-use key and the apparatus identifier which are received, in correspondence with each other in a storage device, and the control device receives the execution-use key and the encrypted execution-use program which are transmitted by the transmission-side communication part, and executes the control of the apparatus based on the execution-use key and the encrypted execution-use program which are received.

Advantageous Effects of Invention

With the control system according to the present invention, an edit-use key necessary for deciphering a control program is prevented from leaking, so that the control program can be protected securely, and even if the company that writes the control program of a PLC and a company that reads the control program of the PLC differ, the execution-use control program can be read from and written into the PLC with an improved convenience.

DESCRIPTION OF EMBODIMENTS

Embodiment 1

Figure 1:
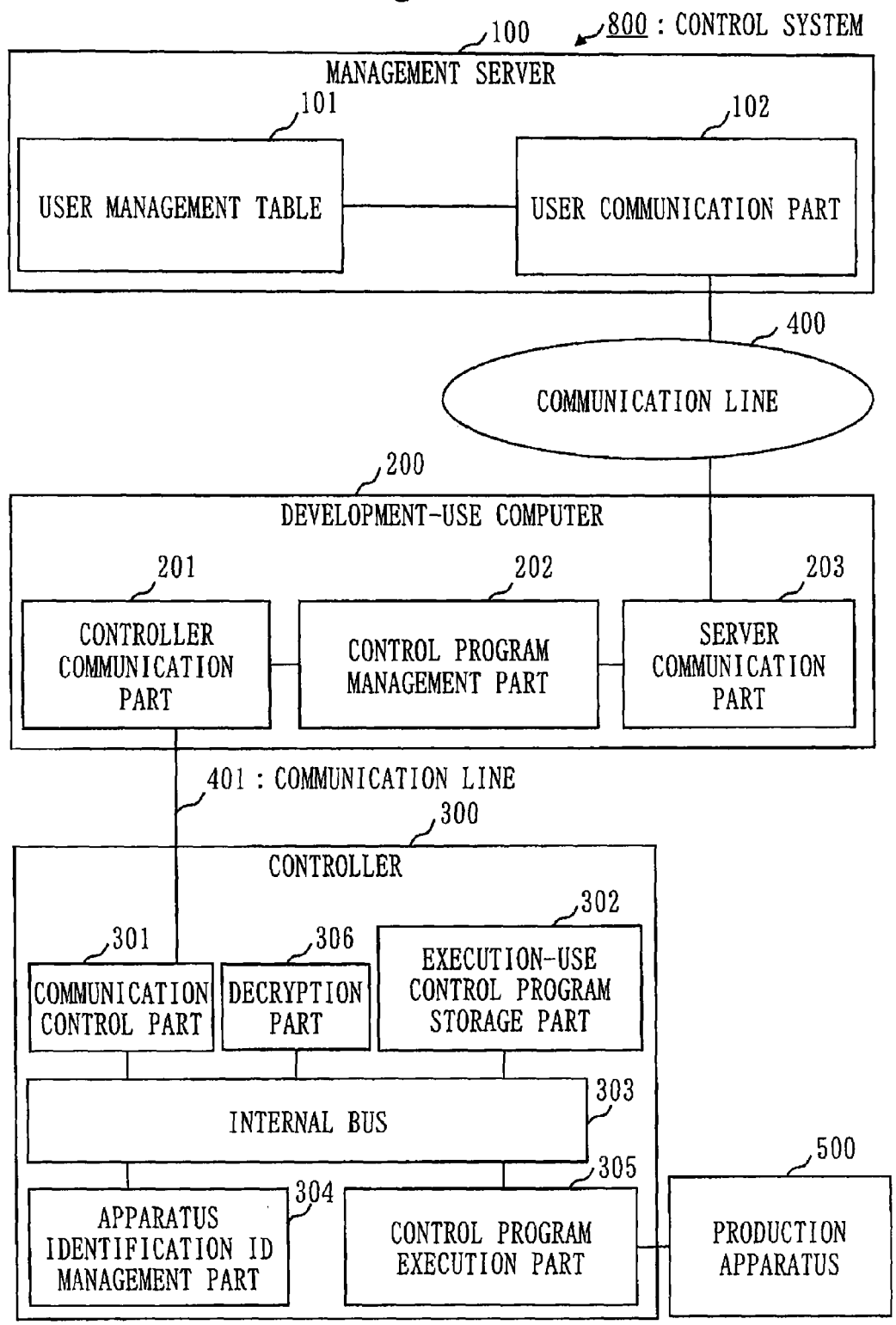
FIG. 1 is a block configuration diagram of a control system 800 according to Embodiment 1.

FIG. 1 is a block configuration diagram of a control system 800 according to this embodiment.

The control system 800 according to this embodiment is, for example, a system for controlling the operation of a production apparatus 500 in a factory.

As shown in FIG. 1, the control system 800 includes a management server 100, a development-use computer 200, and a controller 300. The management server 100 is connected to the development-use computer 200 via a communication line 400. The development-use computer 200 and the controller 300 are connected to each other via a communication line 401.

In the control system 800, the management server 100 manages a user who is in charge of design, maintenance, and the like of a control program. The management server 100 is an example of an authentication server that executes a user authentication process and the like.

The controller 300 is an example of a control apparatus that executes control of the device.

The development-use computer 200 accepts operation of the user, and based on the content of the accepted operation, executes processes such as design and development of the control program.

The control program is a source program that describes the control of the production device 500 which is to be executed by the controller 300.

The development-use computer 200 converts the control program into an execution-use control program that can be executed by the controller 300, and encrypts the converted execution-use control program, thereby generating an execution-use control program that is encrypted (an example of an encrypted execution-use control program).

Also, the development-use computer 200 generates an edit-use key employed when decrypting the execution-use control program that is encrypted (to be referred to as an encrypted execution-use control program 651a hereinafter), into the execution-use control program and converting the decrypted execution-use control program into the control program, and an execution-use key employed when decrypting the encrypted execution-use control program 651a into the execution-use control program.

The development-use computer 200 is an example of a program transmission device that writes the encrypted execution-use control program 651a into the controller 300.

To write the encrypted execution-use control program 651a into the controller 300 is to transmit the encrypted execution-use control program 651a to the controller 300 via the communication line 401.

The development-use computer 200 accepts from the user a write request for the execution-use control program to the controller 300, writes the execution-use control program and the execution-use key into the controller 300, and registers an edit-use key, serving to view the control program, in the management server 100.

A maintenance-use computer 250 may be connected to the control system 800.

The maintenance-use computer 250 accepts from the controller 300 a read request for the execution-use control program, and reads the encrypted execution-use control program 651a from the controller 300.

The maintenance-use computer 250 acquires the edit-use key from the management server 100 during the user authentication process.

Using the edit-use key, the maintenance-use computer 250 converts the encrypted execution-use control program 651a that is read, into a viewable control program 220.

The development-use computer 200 and the maintenance-use computer 250 have the same internal configuration. A single computer that serves as both the development-use computer 200 and the maintenance-use computer 250 may be employed instead. Alternatively, a single computer that serves as only either the development-use computer 200 or the maintenance-use computer 250 may be employed.

For example, the development-use computer 200 is a computer used by a developer company, and the maintenance-use computer 250 is a computer used by a maintenance company.

The controller 300 executes the control program, thus executing control of the production device 500. The controller 300 receives the execution-use key and the encrypted execution-use control program 651a transmitted from the development-use computer 200, and executes control of the production device 500 based on the execution-use key and the encrypted execution-use control program 651a which are received.

The function of the controller 300 will be described with reference to FIG. 1.

The controller 300 includes a communication control part 301, an execution-use control program storage part 302, an internal bus 303, an apparatus identification ID management part 304, a control program execution part 305, and a decryption part 306.

Inside the controller 300, the communication control part 301, the execution-use control program storage part 302, the apparatus identification ID management part 304, the control program execution part 305, and the decryption part 306 are connected to each other via the internal bus 303.

The communication control part 301 is connected to a controller communication part 201 of the development-use computer 200 via the communication line 401.

The communication line 401 is, for example, a USB cable, a LAN cable conforming to Ethernet (registered trademark), or the like.

The execution-use control program storage part 302 stores the execution-use control program, in a storage device provided to the controller 300.

The apparatus identification ID management part 304 stores the apparatus identification ID of the controller 300, in the storage device provided to the controller 300.

The decryption part 306 decrypts the execution-use control program stored in the execution-use control program storage part 302.

The control program execution part 305 is connected to the production device 500. The control program execution part 305 executes the execution-use control program decrypted by the decryption part 306, to control the operation of the production device 500.

The control program execution part 305 reads codes from the execution-use control program storage part 302 as required, and executes a program necessary for controlling the production device 500.

Figure 2:
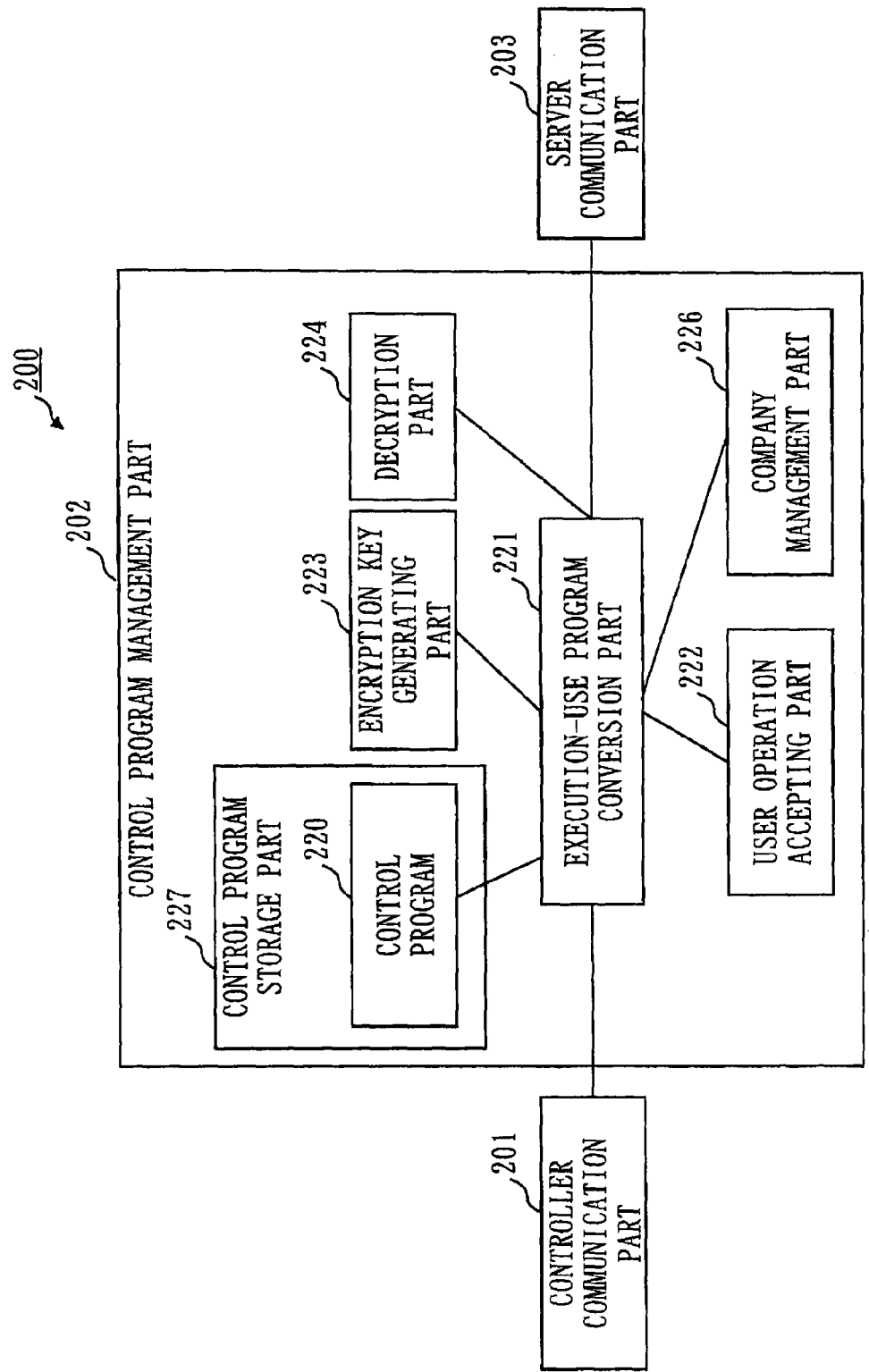
FIG. 2 is a detailed block configuration diagram of a development-use computer 200 according to Embodiment 1.

FIG. 2 is a detailed block configuration diagram of the development-use computer 200 according to this embodiment.

The function of the development-use computer 200 will now be described with reference to FIGS. 1 and 2.

As shown in FIG. 1, the development-use computer 200 includes the controller communication part 201 (a transmission-side communication part and a reception-side communication part), a control program management part 202, and a server communication part 203 (a transmission-side communication part and a reception-side communication part).

The controller communication part 201 communicates with the controller 300 via the communication line 401.

The control program management part 202 manages the control program 220. The control program management part 202 also converts the control program 220 into the execution-use control program. To convert the control program 220 into the execution-use control program is to subject the control program 220 to a process necessary for execution in the controller 300 (an example of the PLC), thereby generating the execution-use control program.

The server communication part 203 communicates with the management server 100 via the communication line 400.

As shown in FIG. 2, the control program management part 202 includes a control program storage part 227, an execution-use program conversion part 221, an encryption key generating part 223, a decryption part 224, a user operation accepting part 222, and a company management part 226.

The control program storage part 227 stores the control program 220 in a storage device provided to the development-use computer 200.

The execution-use program conversion part 221 converts the control program 220 into the execution-use control program. The execution-use program conversion part 221 also converts the execution-use control program into the control program 220.

The encryption key generating part 223 generates a key necessary for viewing the control program 220 and executing the control program 220.

The decryption part 224 decrypts the key necessary for viewing the control program 220 and executing the control program 220.

The user operation accepting part 222 (a transmission-side accepting part and a reception-side accepting part) accepts the operation of the user and determines a process to be performed by the execution-use program conversion part 221.

The company management part 226 manages a company to which the development-use computer 200 belongs.

Figure 3:
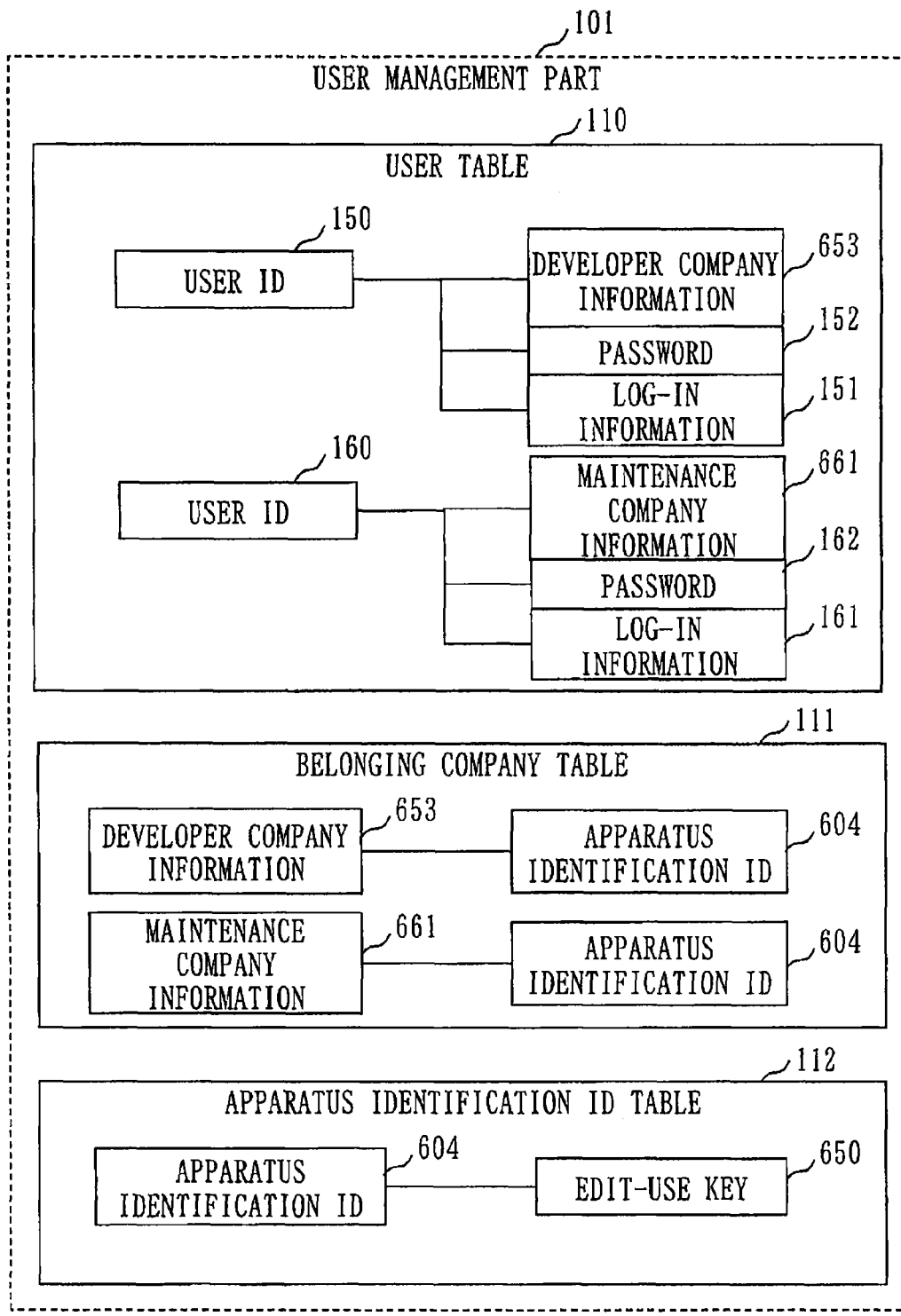
FIG. 3 is a configuration diagram of a user management table 101 provided to a management server 100 according to Embodiment 1.

FIG. 3 is a configuration diagram of a user management table 101 provided to the management server 100 according to this embodiment.

The function of the management server 100 will be described with reference to FIGS. 1 and 3.

As shown in FIG. 1, the management server 100 includes the user management table 101 and a user communication part 102 (a server-side communication part).

The user management table 101 is a table that manages information on a user who uses the control system 800 and is in charge of, for example, development, maintenance, and the like of the control program 220.

The user communication part 102 communicates with the development-use computer 200 via the communication line 400.

As shown in FIG. 3, the user management table 101 includes a user table 110, a belonging company table 111, and the apparatus identification ID table 112.

The user table 110 is a table where a user ID 150 which identifies a user is correlated to belonging company information, a password, and the like. The belonging company information is information that identifies a company to which the user identified by the user ID 150 belongs. The belonging company information includes developer company information 653 and maintenance company information 661.

The belonging company table 111 manages the belonging company information (the developer company information 653 and the maintenance company information 661) in correspondence with apparatus identification IDs 604.

The device identifications ID 604 are each an identifier for identifying the controller 300 (control device). Belonging company information corresponding to the apparatus identification ID is information on companies in charge of development, maintenance, and the like of the control program executed by the controller 300 (control device, control apparatus) which is identified by that apparatus identification ID.

The apparatus identification ID table 112 manages the apparatus identification IDs 604 and the edit-use key 650 which corresponds to the apparatus identification ID 604. The edit-use key 650 corresponding to the apparatus identification ID 604 includes information necessary for viewing the control program written into the controller 300 identified by the apparatus identification ID 604.

FIG. 3 shows a configuration example of the user table 110, the belonging company table 111, and the apparatus identification ID table 112. The configuration of the user table 110, the belonging company table 111, and the apparatus identification ID table 112 will now be described in more detail with reference to FIG. 3.

The user ID 150 of the company that developed the control program, and the developer company information 653, a password 152, and log-in information 151 corresponding to the user ID 150 are registered in the user table 110. Also, a user ID 160 of the company in charge of maintenance of the control program, and the maintenance company information 661, a password 162, and log-in information 161 corresponding to the user ID 160 are registered in the user table 110.

The developer company information 653 and the execution-use control program 651, and the apparatus identification IDs 604 corresponding to them respectively are registered in the belonging company table 111. The apparatus identification ID 604 is an identifier that identifies the controller 300 to be developed or maintained by the developer company information 653 or maintenance company information 661.

The apparatus identification ID 604 and the edit-use key 650 corresponding to the apparatus identification ID 604 are registered in the apparatus identification ID table 112.

The management server 100 and the development-use computer 200 are connected to each other via the communication line 400. Via the communication line 400, the management server 100 and the development-use computer 200 transmit and receive the edit-use key, or information for the authentication process of the user in charge of design or maintenance of the control program 220.

The management server 100 is installed in the factory or a control center located at a remote place. If the management server 100 is installed in the factory, the communication line 400 is constituted by a LAN cable and a communication apparatus attached to the LAN cable.

If the management server 100 is installed outside the control center, the communication line 400 is constituted by a telephone circuit provided by a carrier, an optical cable and a LAN cable, and a communication apparatus attached to the optical cable and the LAN cable.

Figure 4:
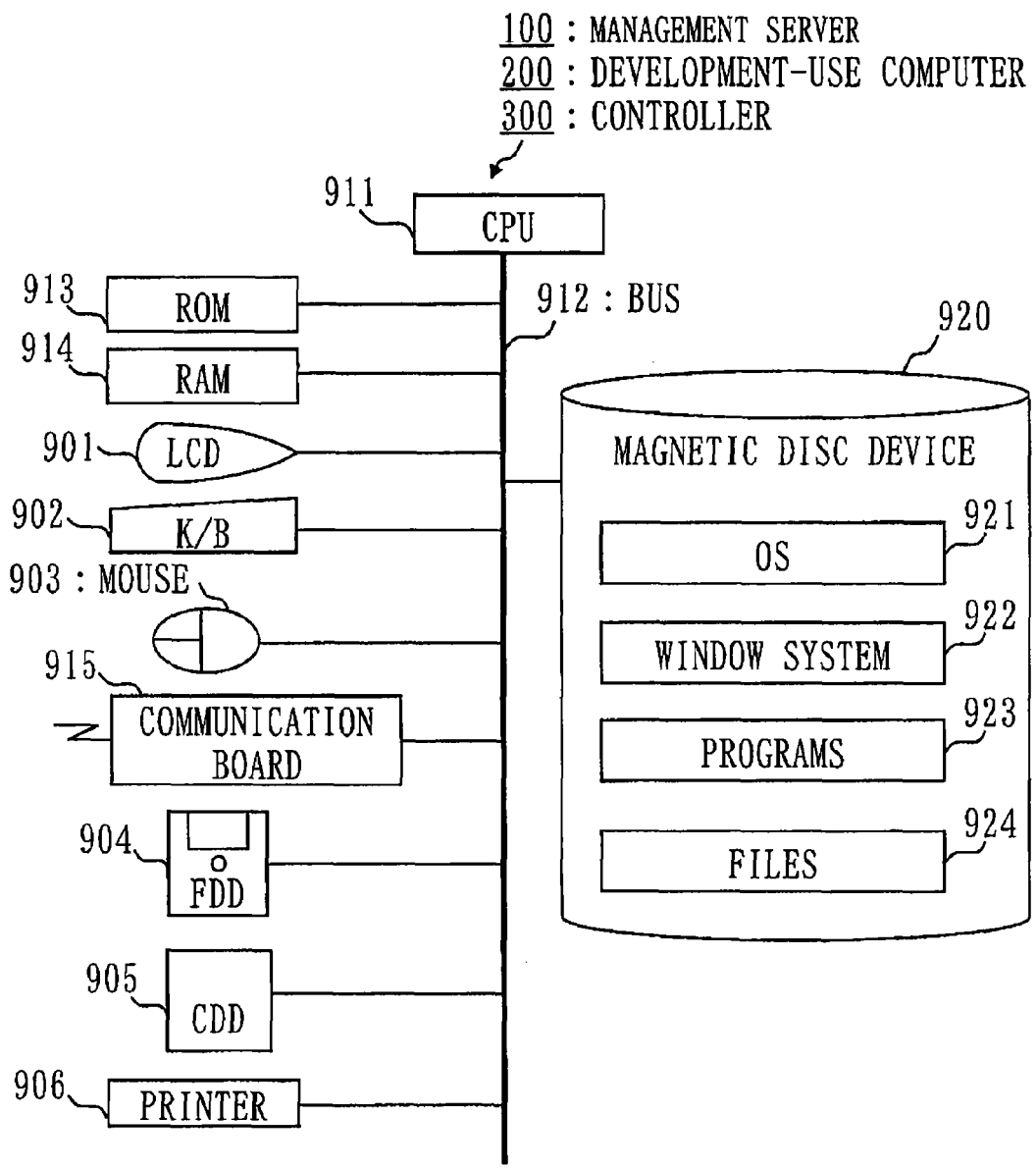
FIG. 4 shows an example of the hardware configuration of the management server 100, the development-use computer 200, and a controller 300 according to Embodiment 1.

FIG. 4 shows an example of the hardware configuration of the management server 100, the development-use computer 200, and the controller 300 according to this embodiment.

Referring to FIG. 4, the management server 100, the development-use computer 200, or the controller 300 is a computer and includes hardware devices such as an LCD 901 (Liquid Crystal Display), a keyboard 902 (KJB), a mouse 903, an FDD 904 (Flexible Disk Drive), a CDD 905 (Compact Disc Drive), and a printer 906. These hardware devices are connected to each other via cables or signal lines. In place of the LCD 901, a CRT (Cathode Ray Tube) or another display device may be employed. In place of the mouse 903, a touch panel, a touch pad, a track ball, a pen tablet, or another pointing device may be employed.

The management server 100, development-use computer 200, or controller 300 includes a CPU 911 (Central Processing Unit) which executes the program. The CPU 911 is an example of a processing device. The CPU 911 is connected to a ROM 913 (Read Only Memory), a RAM 914 (Random Access Memory), a communication board 915, the LCD 901, the keyboard 902, the mouse 903, the FDD 904, the CDD 905, the printer 906, and an HDD 920 (Hard Disk Drive) via a bus 912, and controls these hardware devices.

In place of the HDD 920, a flash memory, an optical disk device, a memory card reader/writer, or another recording medium may be employed.

The RAM 914 is an example of a volatile memory. The ROM 913, FDD 904, CDD 905, and HDD 920 are examples of a nonvolatile memory. These memories are examples of a storage device or storage part. The communication board 915, keyboard 902, mouse 903, FDD 904, and CDD 905 are examples of an input device. Also, the communication board 915, LCD 901, and printer 906 are examples of an output device.

The communication board 915 is connected to a LAN (Local Area Network) or the like. Other than the LAN, the communication board 915 may be connected to a WAN (Wide Area Network) such as an IP-VPN (Internet Protocol Virtual Private Network), a wide area LAN, or an ATM (Asynchronous Transfer Mode) network; or the Internet. The LAN, WAN, and Internet are examples of a network.

The HDD 920 stores an operating system 921 (OS), a window system 922, programs 923, and files 924. The CPU 911, operating system 921, and window system 922 execute each program of the programs 923. The programs 923 include a program that executes the function described as a "part" in this embodiment. The program is read and executed by the CPU 911. The files 924 include data, information, signal values, variable values, and parameters explained as "data", "information", "ID (identifier)", "flag", and "result" in the description of this embodiment, as items of "file", "database", and "table". The "file", "database", and "table" are stored in a recording medium such as the RAM 914 or HDD 920. The data, information, signal values, variable values, and parameters stored in the recording medium such as the RAM 914 or HDD 920 are read into the main memory or cache memory by the CPU 911 through a read/write circuit, and are used for the processing (operation) of the CPU 911 such as extraction, search, look-up, comparison, arithmetic operation, computation, control, output, print, and display. The data, information, signal values, variable values, and parameters are temporarily stored in the main memory, cache memory, or buffer memory during the processing of the CPU 911 such as extraction, search, look-up, comparison, arithmetic operation, computation, control, output, print, and display.

The arrows in the block diagrams and flowcharts used in the description of this embodiment mainly indicate input/output of data and signals. The data and signals are recorded in the memory such as the RAM 914; the flexible disk (FD) of the FDD 904; the compact disc (CD) of the CDD 905; the magnetic disc, an optical disk, a DVD (Digital Versatile Disc) of the HDD 920; or other recording media. The data and signals are transmitted via the bus 912, a signal line, a cable, or other transmission media.

The "part" described in this embodiment may be a "circuit", "device", or "apparatus"; or a "step", "process", "procedure", or "processing". Namely, a "part" may be implemented as firmware stored in the ROM 913. Alternatively, a "part" may be implemented by only software; by only hardware such as an element, a device, a substrate, or a wiring line; by a combination of software and hardware; or furthermore by a combination of software, hardware, and firmware. The firmware and software are stored, as programs, in a recording medium such as a flexible disc, compact disc, magnetic disc, optical disc, or DVD. The program is read by the CPU 911 and executed by the CPU 911. That is, the program causes the computer to function as a "part" referred to in this embodiment. Alternatively, the program causes the computer to execute the procedure or method of a "part" referred to in this embodiment.

Figure 5:
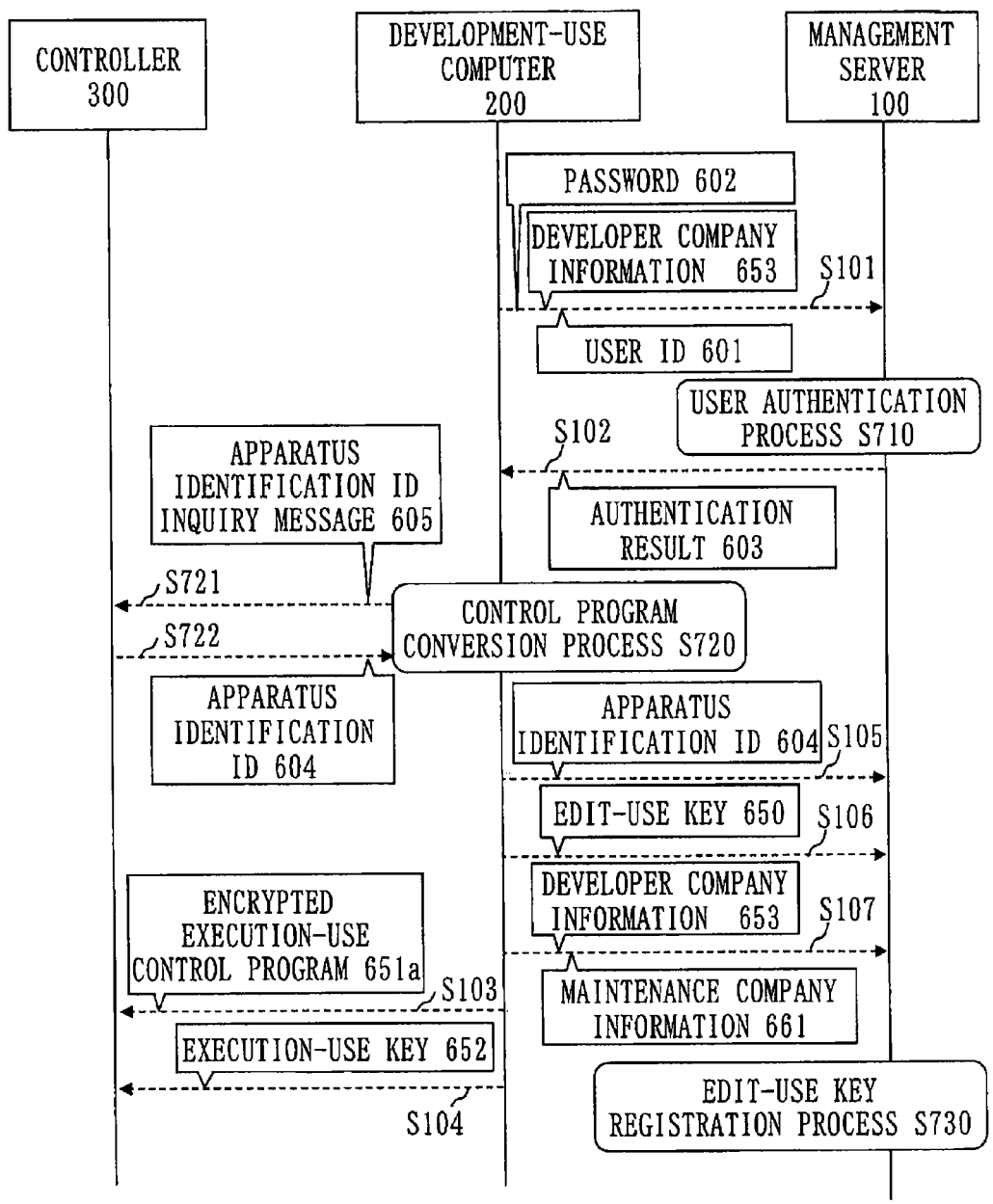
FIG. 5 is a sequence chart showing the procedure of writing an execution-use control program 651 from the development-use computer 200 into the controller 300 in the control system 800 according to Embodiment 1.

FIG. 5 is a sequence chart showing a procedure of writing the execution-use control program 651 from the development-use computer 200 into the controller 300, in the control system 800 of this embodiment.

The procedure of writing the execution-use control program 651 from the development-use computer 200 into the controller 300 will be described with reference to FIG. 5.

The process shown in FIG. 5 shows the process flow, after the user instructs the controller 300 to execute writing of the execution-use control program, of the development-use computer 200 from writing the execution-use control program to the controller 300 up to registering the edit-use key for viewing the control program, in the management server 100.

The development-use computer 200 accepts from the user the operation of the execution-use control program writing instruction for the controller 300.

For example, the user operation accepting part 222 displays a user input window or the like on the display device of the development-use computer 200. The user operation accepting part 222 accepts the content of the operation entered in the user input window.

At this time, the user operation accepting part 222 (transmission-side accepting part) receives as input, a user ID 601, a password 602, and the developer company information 653 entered in the user input window by the user.

The content of the operation entered in the user input window is, for example, an instruction to write the execution-use control program to the controller 300 (to be referred to as execution-use control program writing instruction hereinafter).

The user ID 601, the password 602, and the developer company information 653 are examples of authentication information used for the user authentication process.

The user operation accepting part 222 inputs the entered user ID 601, password 602, and developer company information 653 to the user communication part 102.

In S101 of FIG. 5, the user communication part 102 transmits the user ID 601, password 602, and developer company information 653 inputted from the user operation accepting part 222, to the management server 100 as an authentication request via the communication line 400.

The user communication part 102 of the management server 100 receives the authentication request from the server communication part 203 of the development-use computer 200. Upon reception of the authentication request, the management server 100 executes a user authentication process S710 with the processing device using the user ID 601, password 602, and developer company information 653 included in the authentication request. The management server 100 is an example of the authentication server. The management server 100 is also an example of an authentication part which executes the user authentication process.

Figure 6:
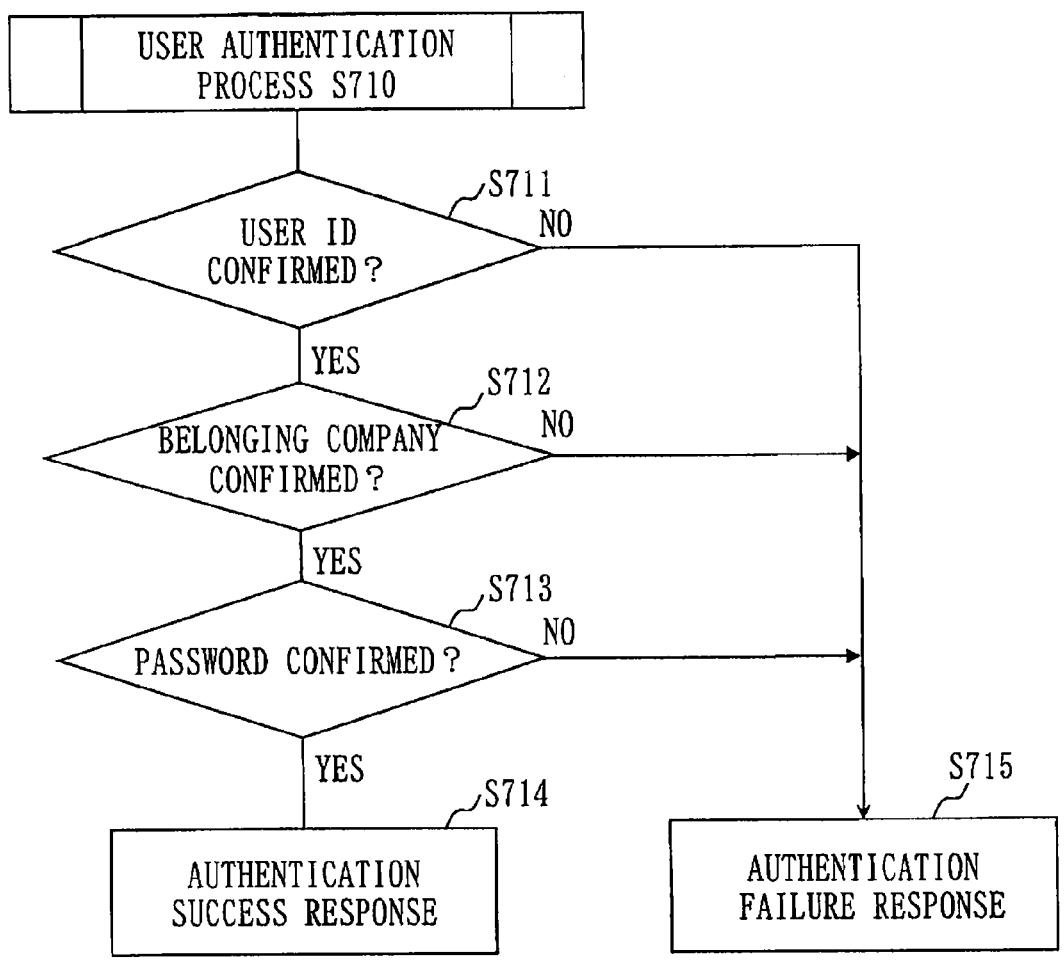
FIG. 6 is a flowchart showing the flow of a user authentication process S710 of the management server 100 according to Embodiment 1.

FIG. 6 is a flowchart showing the flow of user authentication process S710 of the management server 100 according to Embodiment 1.

User authentication process S710 of the management server 100 will be described with reference to FIG. 6.

The management server 100 checks, with the processing device, whether or not the user ID 601, password 602, and developer company information 653 notified from the development-use computer 200 match the user ID 150, password 152, and developer company information 653 registered in the user table 110.

In S711, the management server 100 searches the user table 110 using the inputted user ID 601.

If it is confirmed that a user ID which is the same as the inputted user ID 601 exists in the user table 110 (YES in S711), the management server 100 forwards the process to S712. At this time, the management server 100 extracts the developer company information 653 and password 152 corresponding to the user ID 150 which is the same as the inputted user ID 601, from the user table 110 and stores the extracted developer company information 653 and password 152 in the storage device.

If a user ID which is the same as the inputted user ID 601 does not exist (cannot be confirmed) in the user table 110 (NO in S711), the management server 100 forwards the process to S715.

In S715, the management server 100 sets "authentication failure" in an authentication result 603.

In S712, the management server 100 checks with the processing device whether or not the inputted developer company information 653 matches the developer company information 653 (the developer company information 653 corresponding to the user ID 601 (150)) extracted from the user table 110.

If the inputted developer company information 653 is confirmed to match the developer company information 653 extracted from the user table 110 (YES in S712), the management server 100 forwards the process to S713.

If the inputted developer company information 653 cannot be confirmed to match the developer company information 653 extracted from the user table 110 (NO in S712), the management server 100 forwards the process to S715.

In S715, the management server 100 sets "authentication failure" in an authentication result 603.

In S713, the management server 100 checks with the processing device whether or not the inputted password 602 matches the password 152 (the password corresponding to the user ID 601 (150)) extracted from the user table 110.

If the inputted password 602 is confirmed to match the password 152 extracted from the user table 110 (YES in Y713), the management server 100 forwards the process to S714.

In S714, the management server 100 sets "authentication success" in the authentication result 603.

If the inputted password 602 cannot be confirmed to match the password 152 extracted from the user table 110 (NO in S713), the management server 100 forwards the process to S715.

In S715, the management server 100 sets "authentication failure" in the authentication result 603.

The explanation of FIG. 6 is concluded.

In S102 of FIG. 5, when the user authentication process S710 is completed, the user communication part 102 of the management server 100 transmits the authentication result 603 to the development-use computer 200 via the communication line 400.

As described above, if at least one of the inputted user ID 601, password 602, and developer company information 653 does not match the user table 110, the management server 100 transmits an authentication failure response as in S715. When all of the inputted user ID 601, password 602, and developer company information 653 match the user table 110, the management server 100 sets an authentication success response in the authentication result 603, as in S714, and notifies the development-use computer 200 of the authentication result 603.

In S102 of FIG. 5, the server communication part 203 of the development-use computer 200 receives the authentication result 603 from the user communication part 102 of the management server 100.

The control program management part 202 checks the authentication response set in the received authentication result 603, with the processing device.

If it is determined that the authentication response set in the authentication result 603 is "authentication failure", the control program management part 202 ends the process. In this case, the control program management part 202 displays, for example, an error message "authentication failure" on the display device.

If it is determined that the authentication response set in the authentication result 603 is "authentication failure", the control program management part 202 executes a control program conversion process S720.

Figure 7:
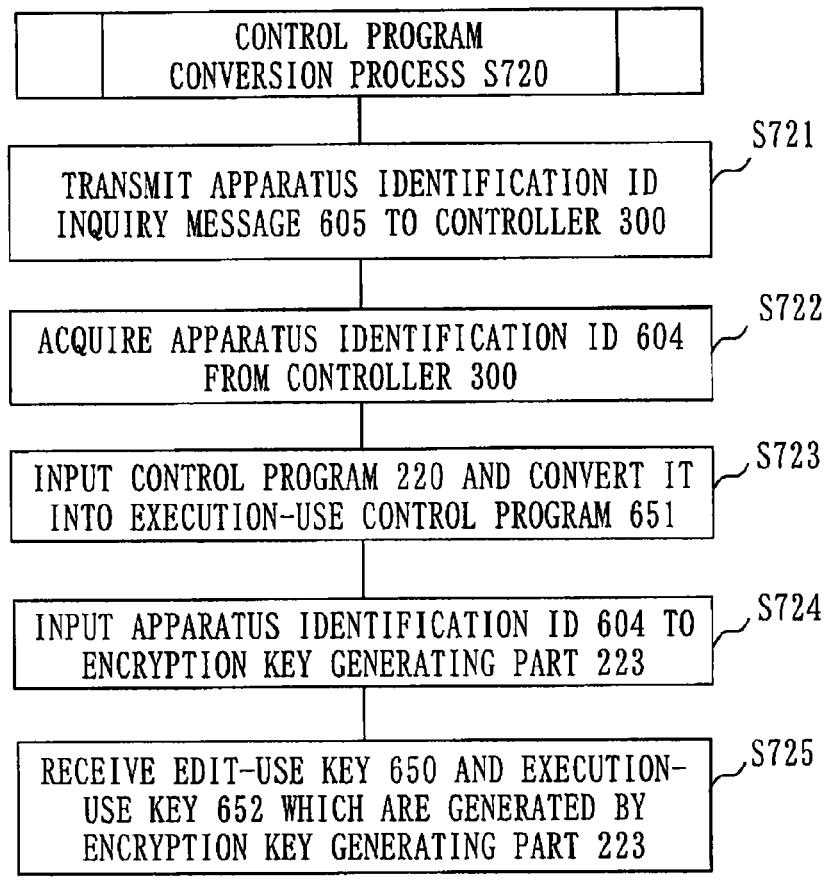
FIG. 7 is a flowchart showing the flow of a control program conversion process S720 of the development-use computer 200 according to Embodiment 1.

FIG. 7 is a flowchart showing the flow of the control program conversion process S720 of the development-use computer 200 according to this embodiment.

The control program conversion process S720 of the development-use computer 200 will be described with reference to FIG. 7.

The execution-use program conversion part 221 of the control program management part 202 executes the control program conversion process S720.

In S721, the execution-use program conversion part 221 transmits to the controller 300 an apparatus identification ID inquiry message 605 for acquiring the apparatus identification ID of the controller 300.

Upon reception of the apparatus identification ID inquiry message 605, the controller 300 acquires the apparatus identification ID 604 that identifies the controller 300, from the apparatus identification ID management part 304. The communication control part 301 of the controller 300 transmits the acquired apparatus identification ID 604 to the development-use computer 200 via the communication line 401.

In S722, the controller communication part 201 of the development-use computer 200 receives the apparatus identification ID 604 of the controller 300. The controller communication part 201 of the development-use computer 200 inputs the received apparatus identification ID 604 to the control program management part 202. The control program management part 202 acquires the apparatus identification ID 604 in the above manner. The control program management part 202 is an example of a transmission-side acquisition part which acquires the apparatus identification ID 604 (apparatus identifier) that identifies the controller 300.

In S723, the execution-use program conversion part 221 of the control program management part 202 receives as input, the control program 220. The control program 220 is a source program that describes the control of the production apparatus 500 which is to be executed by the controller 300. The control program 220 is, for example, a ladder program described in the ladder language.

The execution-use program conversion part 221 converts the inputted control program 220 into the execution-use control program 651 that can be executed in the controller 300. The execution-use control program 651 is, for example, an object program (an example of the execution-use program) that can be executed in the controller 300.

In S724, the encryption key generating part 223 receives as input, the execution-use control program 651 converted by the execution-use program conversion part 221 and the apparatus identification ID 604 acquired from the controller 300. The encryption key generating part 223 generates the edit-use key used when decrypting the encrypted execution-use control program 651a into the execution-use control program 651 and converting the decrypted execution-use control program 651 into the control program 220. The encryption key generating part 223 generates the execution-use key used when decrypting the encrypted execution-use control program 651a into the execution-use control program 651. The encryption key generating part 223 is an example of the key generating part.

Upon reception (input) of the apparatus identification ID 604, the encryption key generating part 223 generates the edit-use key 650 necessary for viewing the control program 220 and an execution-use key 652 necessary for executing the execution-use control program 651 of the controller 300, and notifies the execution-use program conversion part 221 of the edit-use key 650 and execution-use key 652.

In S725, the execution-use program conversion part 221 receives the edit-use key 650 and the execution-use key 652. The control program conversion process S720 is completed.

In S103 to S104, the control program management part 202 outputs the execution-use key 652 generated by the encryption key generating part 223, and the encrypted execution-use control program 651a to the controller communication part 201.

The controller communication part 201 receives as input, the execution-use key 652 and encrypted execution-use control program 651a from the control program management part 202. The controller communication part 201 transmits the inputted execution-use key 652 and encrypted execution-use control program 651a to the controller 300 via the communication line 401. The controller communication part 201 is an example of the transmission-side communication part.

The communication control part 301 of the controller 300 writes the encrypted execution-use control program 651a and execution-use key 652 transmitted from the development-use computer 200, into the execution-use control program storage part 302.

The execution-use program conversion part 221 of the development-use computer 200 acquires the belonging company information of the development-use computer 200 which is registered in advance with the company management part 226. In the case of the development-use computer 200, the developer company information 653 is registered. In the case of the maintenance-use computer 250, the maintenance company information 661 is registered.

Alternatively, the developer company information 653 of the development-use computer 200 and the maintenance company information 661 which is in charge of after-development management may be registered in the company management part 226 of the development-use computer 200. Also, the maintenance company information 661 of the maintenance-use computer 250 and the developer company information 653 which is in charge of development of the control program to be maintained may be registered in the company management part 226 of the maintenance-use computer 250.

In S105 to S107, the server communication part 203 of the development-use computer 200 transmits the edit-use key 650, the apparatus identification ID 604, the developer company information 653, and the maintenance company information 661 to the management server 100 via the communication line 400.

The server communication part 203 is an example of the transmission-side communication part that transmits the edit-use key 650 generated by the encryption key generating part 223 and the apparatus identification ID 604 acquired from the controller 300, to the management server 100.

The user communication part 102 (server-side communication part) of the management server 100 transmits the edit-use key 650, the apparatus identification ID 604, the developer company information 653, and the maintenance company information 661 from the development-use computer 200. In an edit-use key registration process S730, the management server 100 registers the edit-use key 650, apparatus identification ID 604, developer company information 653, and maintenance company information 661 with the user management table 101.

Figure 8:
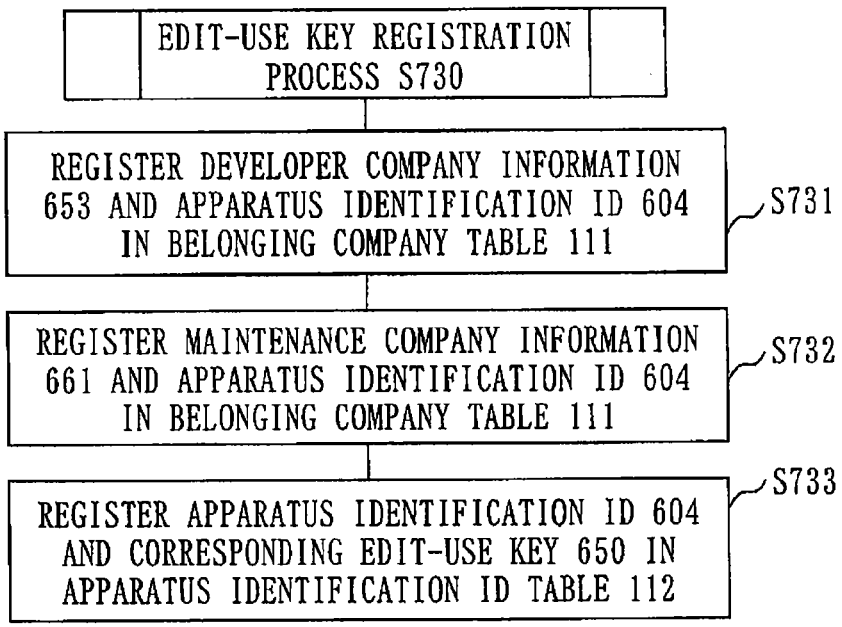
FIG. 8 is a flowchart showing the flow of an edit-use key registration process S730 of the management server 100 according to Embodiment 1.

FIG. 8 is a flowchart showing the flow of the edit-use registration process S730 of the management server 100 according to Embodiment 1.

The flow of the edit-use key registration process S730 of the management server 100 will be described with reference to FIG. 8.

In S731, the management server 100 registers the developer company information 653 and the apparatus identification ID 604 in correspondence with each other in the belonging company table 111.

In S732, the management server 100 registers the maintenance company information 661 and the apparatus identification ID 6041 in correspondence with each other in the belonging company table 111.

In S733, the management server 100 registers the apparatus identification ID 604 and the edit-use key 650 in correspondence with each other in the apparatus identification ID table 112.

The explanation is concluded on the process flow, after the user instructs the controller 300 to execute writing of the execution-use control program to the controller 300, of the development-use computer 200 from writing the execution-use control program to the controller 300 up to registering the edit-use key for viewing the control program, in the management server 100.

As described above, the control system 800 according to this embodiment is a facility control system, and includes the controller 300 which controls the operation of the facility, the first computer (development-use computer 200) which is connected to the controller 300 via the first communication line (communication line 401) and reads and writes the control program 220 from and into the controller 300, and the server (management server 100) which is connected to the first computer via the second communication line (communication line 400).

The control system 800 according to this embodiment also includes a means as follows which is used when writing the control program from the first computer into the controller.

First, the server includes an authentication means which authenticates, using the first computer, the user wishing to write, and the belonging company, and makes a decision on permission of writing into the first computer.

The first computer includes a generating means for generating an encryption key (edit-use key) for reading the apparatus identification ID from the controller so as to enable viewing the control program, and an encryption key (execution-use key 652) for enabling execution of the control program.

The first computer also includes a writing means for writing the encryption key (execution-use key 652) which is generated by the key generating means and enables viewing of the control program and execution of the control program, into the controller.

The server includes a means for storing the belonging company of the first computer, the apparatus identification ID of the controller, and the encryption key (edit-use key 650) that enables viewing of the control program.

As described above, with the control system 800 according to this embodiment, the edit-use key necessary for decrypting the control program is prevented from leaking, so that the control program can be protected securely.

Embodiment 2

This embodiment will be described in terms of differences from Embodiment 1. In this embodiment, a configuration, a process, a means, and a procedure which have the same function as that described in Embodiment 1 will be denoted by the same reference numerals, and their description may be omitted depending on the case.

This embodiment will explain a process in the control system 800 described in Embodiment 1, from reading the encrypted execution-use control program 651a from the controller 300 up to converting the readout encrypted execution-use control program 651a into the viewable and editable control program 220, using the maintenance-use computer 250.

Figure 9:
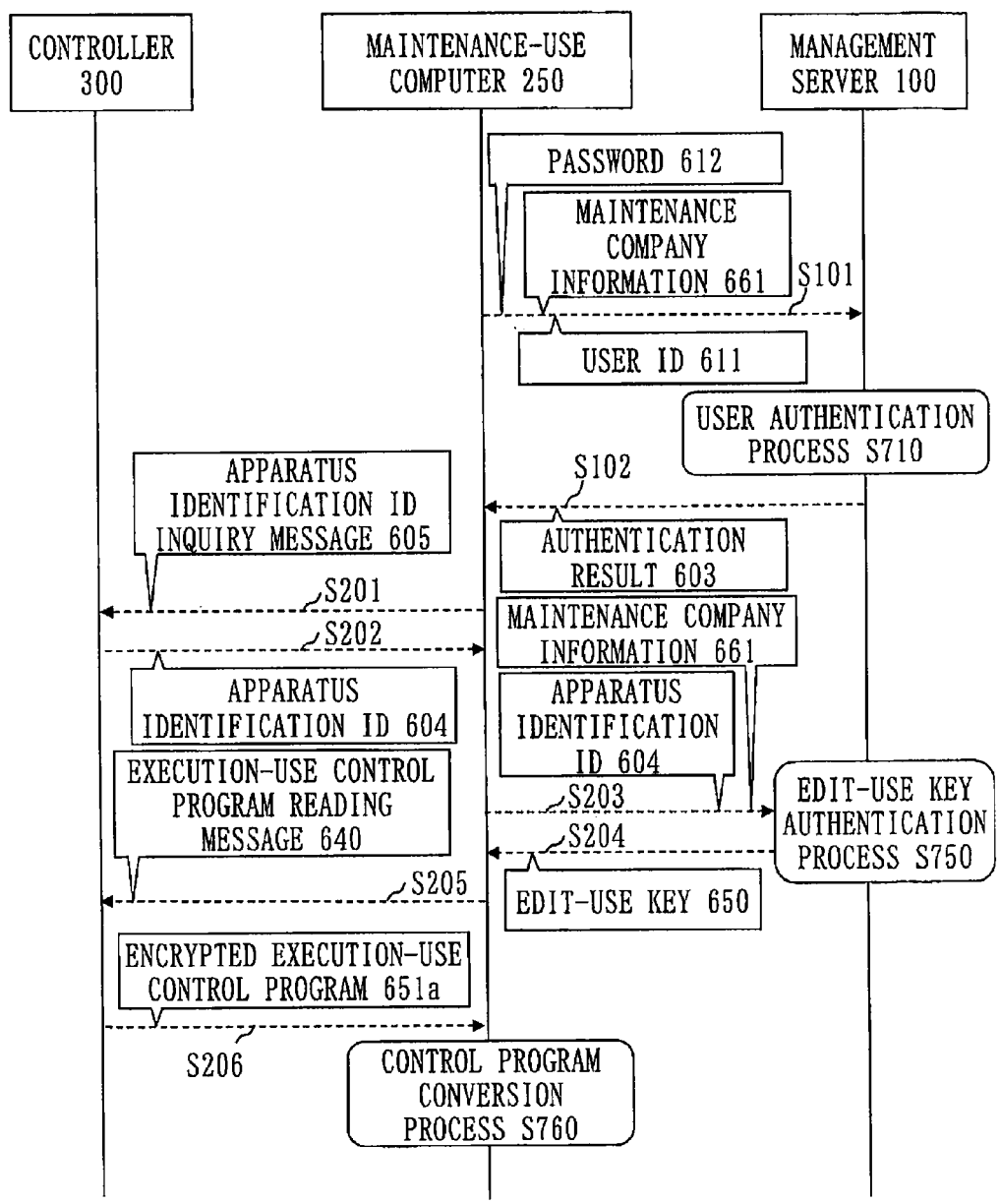
FIG. 9 is a sequence chart showing the procedure of reading an encrypted execution-use control program 651a from a controller 300 into a maintenance-use computer 250 in a control system 800 according to Embodiment 2.

FIG. 9 is a sequence chart showing the procedure of reading an encrypted execution-use control program 651a from a controller 300 into a maintenance-use computer 250, in a control system 800 according to this embodiment.

A procedure of reading the encrypted execution-use control program 651a from the controller 300 into the maintenance-use computer 250 and converting the readout encrypted execution-use control program 651a into a viewable control program 220 will be described with reference to FIG. 9.

A user operation accepting part 222 of the maintenance-use computer 250 accepts the read request for the encrypted execution-use control program 651a from the user.

Upon acceptance of the read request for the encrypted execution-use control program 651a, the maintenance-use computer 250 reads the encrypted execution-use control program 651a from the controller 300, and obtains an edit-use key necessary for viewing the control program 220 from a management server 100.

Using an obtained edit-use key 650, the maintenance-use computer 250 converts the encrypted execution-use control program 651a into the viewable control program 220.

The maintenance-use computer 250 accepts an operation of a reading instruction, being a request to read the encrypted execution-use control program 651a from the controller 300, from the user.

For example, the user operation accepting part 222 displays a user input window or the like on the display device of the maintenance-use computer 250. The user operation accepting part 222 accepts the content of the operation entered in the user input window.

At this time, the user operation accepting part 222 receives as input, a user ID 601, a password 602, and maintenance company information 661 entered in the user input window by the user.

The content of the operation entered in the user input window is, for example, an instruction to read the encrypted execution-use control program 651a (to be referred to as execution-use control program reading instruction hereinafter) from the controller 300.

The user operation accepting part 222 inputs the entered user ID 601, password 602, and maintenance company information 661 to a user communication part 102. The user operation accepting part 222 is an example of the reception-side accepting part.

In S101 of FIG. 9, the user communication part 102 transmits the user ID 601, password 602, and maintenance company information 661 inputted from the user operation accepting part 222, to a management server 100 as an authentication request via a communication line 400.

The user communication part 102 of the management server 100 receives the authentication request from the server communication part 203 of the maintenance-use computer 250. Upon reception of the authentication request, the management server 100 executes a user authentication process S710 with the processing device using the user ID 601, password 602, and maintenance company information 661 included in the authentication request.

As described in Embodiment 1, the internal configuration of the maintenance-use computer 250 is the same as the internal configuration of the development-use computer 200 shown in FIG. 2, except that the preset value of a company management part 226 is different from the preset value of the development-use computer 200. More specifically, it should be noted that the company that owns a development-use computer 200 is different from the company that owns the maintenance-use computer 250.

Upon acceptance of the execution-use control program reading operation of the user, the maintenance-use computer 250 executes a process of reading the execution-use control program from the controller 300. At this time, the maintenance-use computer 250 notifies the management server 100 of a user ID 611, a password 612, and the maintenance company information 661. The management server 100 executes user authentication process S710.

The user authentication process S710 is the same as that described in Embodiment 1 except that the maintenance company information 661 replaces the developer company information 653.

As shown in FIG. 9, in the user authentication process S710, the management server 100 checks with the processing device whether or not the received user ID 611, password 612, and maintenance company information 661 match a user ID 160, a password 162, and the maintenance company information 661 which are registered in a user table 110 (see S711 to S713 of FIG. 6).

If at least one of the user ID 160, password 162, and maintenance company information 661 does not match its counterpart in the user table 110, the management server 100 sets an authentication failure response in an authentication result 603, and transmits the authentication result 603 to the maintenance-use computer 250 (S102 of FIG. 9).

When all of the user ID 160, password 162, and maintenance company information 661 match their counter parts, the management server 100 sets an authentication success response in the authentication result 603, and transmits the authentication result 603 to the maintenance-use computer 250 (S102 of FIG. 9).

A control program management part 202 of the maintenance-use computer 250 confirms the authentication result 603 from the management server 100, with the processing device. If the authentication result 603 is an authentication success, the control program management part 202 transmits an apparatus identification ID inquiry message 605 to the controller 300 (S201).

Upon reception of the apparatus identification ID inquiry message 605, the controller 300 notifies the control program management part 202 of an apparatus identification ID 604 of the controller 300 (S202).

The control program management part 202 transmits the acquired apparatus identification ID 604 and the maintenance company information 661 to the management server 100 (S203). Upon reception of the apparatus identification ID 604 and the maintenance company information 661, the management server 100 executes an edit-use key authentication process S750, and transmits the edit-use key 650 to the maintenance-use computer 250 (S204). The control program management part 202 is an example of the reception-side acquisition part.

Figure 10:
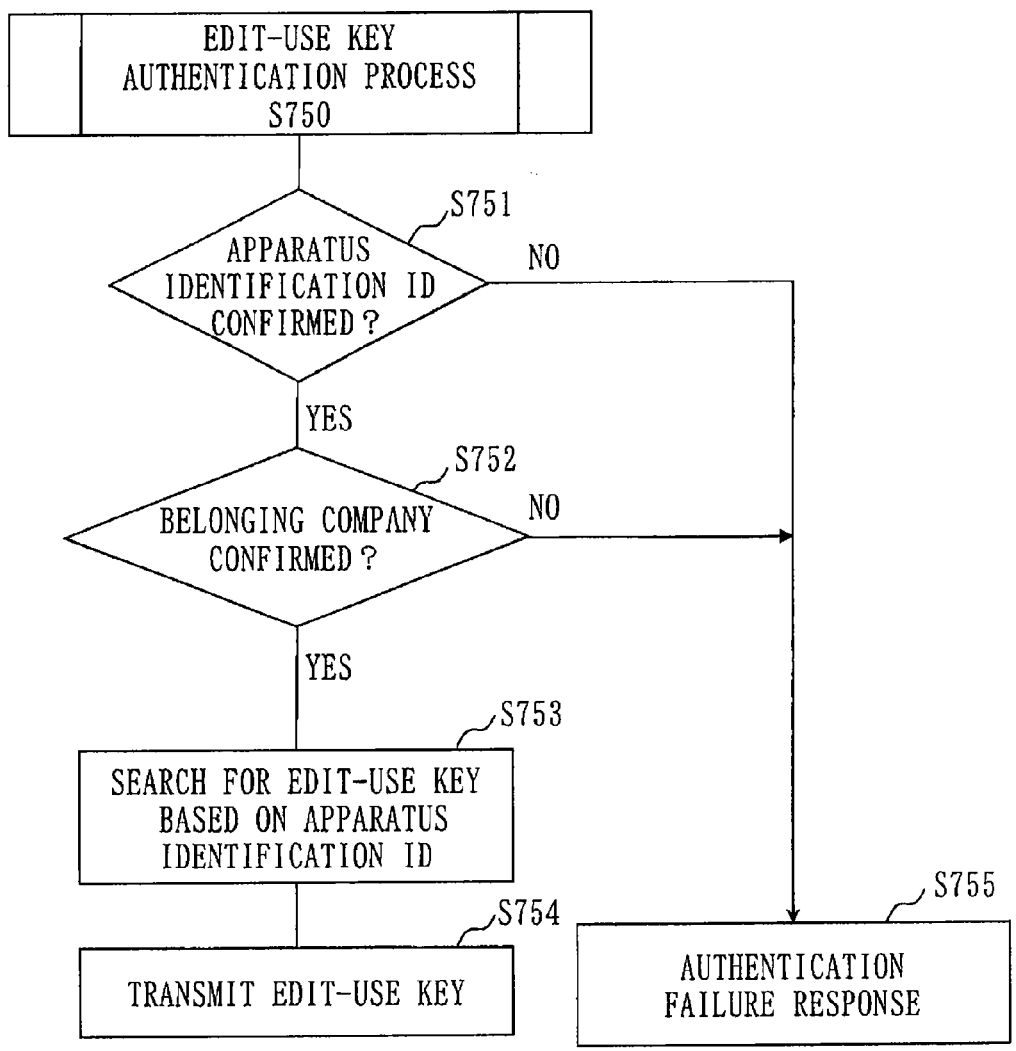
FIG. 10 is a flowchart showing the flow of an edit-use key authentication process S750 of a management server 100 according to Embodiment 2.

FIG. 10 is a flowchart showing the flow of the edit-use key authentication process S750 of the management server 100 according to this embodiment.

The flow of edit-use key authentication process S750 of the management server 100 will be described with reference to FIG. 10.

In S751, the management server 100 confirms with the processing device whether or not the received apparatus identification ID 604 is registered in an apparatus identification ID table 112 (see FIG. 3).

If it is confirmed that the inputted apparatus identification ID 604 is registered in the apparatus identification ID table 112 (YES in S751), the management server 100 forwards the process to S752.

If registration of the received apparatus identification ID 604 in the apparatus identification ID table 112 cannot be confirmed (NO in S751), the management server 100 forwards the process to S755.

In S752, the management server 100 checks with the processing device whether or not the received maintenance company information 661 is registered in a belonging company table 111 and corresponds to the received apparatus identification ID 604.

If it is confirmed that the received maintenance company information 661 is received in the belonging company table 111 and corresponds to the received apparatus identification ID 604 (YES in S752), the management server 100 forwards the process to S753.

If the received maintenance company information 661 is not confirmed to have been registered in the belonging company table 111 or correspond to the received apparatus identification ID 604 (NO in S752), the management server 100 forwards the process to S755.

In S753, the management server 100 acquires the edit-use key 650 corresponding to the apparatus identification ID 604 from the apparatus identification ID table 112.

In S754, the management server 100 sets the acquired edit-use key 650 in a key authentication response.

In S755, the management server 100 sets "authentication failure" in the key authentication response. More specifically, if the apparatus identification ID 604 does not exist in the apparatus identification ID table 112 or, even if it does, when the apparatus identification ID 604 and the maintenance company information 661 do not match each other in the belonging company table 111, the management server 100 sets "authentication failure" in the key authentication response.

The explanation of the edit-use key authentication process S750 of the management server 100 is concluded.

In S204 of FIG. 9, the user communication part 102 of the management server 100 transmits the key authentication response to the maintenance-use computer 250 via the communication line 400.

At this time, if the edit-use key authentication is successful (authentication success), the edit-use key 650 has been set in the key authentication response; if the edit-use key authentication fails (authentication failure), an authentication failure is set in the key authentication response.

In S205 of FIG. 9, upon reception of the edit-use key 650 as the key authentication response, the maintenance-use computer 250 transmits to the controller 300, an execution-use control program reading message 640 (an example of the reading instruction) requesting reading of the encrypted execution-use control program 651a. The maintenance-use computer 250 is an example of a program reception device. A controller communication part 201 is an example of the reception-side communication part.

The controller 300 receives the execution-use control program reading message 640 from the maintenance-use computer 250. The controller 300 reads the encrypted execution-use control program 651a from an execution-use control program storage part 302.

At this time, the controller 300 may read the encrypted execution-use control program 651a and an execution-use key 652 from the execution-use control program storage part 302 and may input them to a decryption part 306. Based on the encrypted execution-use control program 651a and the execution-use key 652, the decryption part 306 decrypts the encrypted execution-use control program 651a into an execution-use control program 651. A communication control part 301 of the controller 300 may transmit the execution-use control program 651 decrypted by the decryption part 306 to the maintenance-use computer 250.

Note that in this embodiment, the controller 300 reads the encrypted execution-use control program 651a from the execution-use control program storage part 302, and the communication control part 301 transmits the encrypted execution-use control program 651a to the maintenance-use computer 250.

The controller communication part 201 of the maintenance-use computer 250 receives the encrypted execution-use control program 651a from the controller 300.

The controller communication part 201 of the maintenance-use computer 250 inputs the received encrypted execution-use control program 651a to a control program management part 202.

Based on the edit-use key 650 received from the management server 100 and the encrypted execution-use control program 651a received from the controller 300, the maintenance-use computer 250 executes a control program conversion process S760 of converting the encrypted execution-use control program 651a into the viewable control program 220.

The control program conversion process S760 in the maintenance-use computer 250 will be described hereinafter.

A decryption part 224 of the control program management part 202 receives as input, the edit-use key 650 and the encrypted execution-use control program 651a, and decrypts the encrypted execution-use control program 651a into the execution-use control program 651.

An execution-use program conversion part 221 of the control program management part 202 receives as input, the edit-use key 650 and the execution-use control program 651, and converts the execution-use control program 651 into the control program 220 which is viewable and editable.

The maintenance-use computer 250 accepts the control program reading request of a user who has logged in (S101 to S102). The maintenance-use computer 250 executes the control program conversion process S760 to acquire the viewable, editable control program 220. After that, by the user operation, the maintenance-use computer 250 executes a process such as maintenance, edit, alteration, or correction of the control program 220.

Based on the request from the user, the maintenance-use computer 250 subjects the viewable control program 220 to a process such as maintenance, edit, alteration, correction, or the like, thus generating a post-alteration control program 220a.

Through the process of S720 of FIG. 5, the maintenance-use computer 250 converts the post-alteration control program 220a into the execution-use program and furthermore encrypts the altered post-alteration control program 220a, thus generating an encrypted execution-use post-alteration control program 221a. At this time, the maintenance-use computer 250 generates a new edit-use key 650 and a new execution-use key 652.

Through the processes of S103 to S107, the maintenance-use computer 250 registers the new edit-use key 650 in the management server 100. The maintenance-use computer 250 transmits the new execution-use key 652 and the encrypted execution-use post-alteration control program 221a to the controller 300.

As described above, upon reception of the edit-use key 650, the maintenance-use computer 250 according to this embodiment reads the execution-use control program 651 from the controller 300, inputs the edit-use key 650 to the decryption part 224, decrypts information necessary for viewing the execution-use control program, and converts the execution-use control program 651 into the viewable control program 220.

As described above, the control system 800 according to this embodiment includes the following means that are used when reading the control program from the controller using the second computer (maintenance-use computer 250) that reads and writes the control program from and into the controller (controller 300).

The server (management server 100) includes an authentication means for authenticating the user who reads the control program, and the belonging company of the user, and determines whether to give a reading permission to the second computer.

The second computer includes a means for reading the apparatus identification ID from the controller and notifying the server of the apparatus identification ID.

The server includes a means for transmitting, upon reception of the apparatus identification ID from the second computer, the encryption key (edit-use key 650) that allows viewing the control program corresponding to the apparatus identification ID, to the second computer.

The second computer includes a means for reading, upon reception of the encryption key (edit-use key 650) from the server, the control program (encrypted execution-use control program 651a or execution-use control program 651) from the controller, and enabling viewing of the control program using the encryption key.

As described above, with the control system 800 according to this embodiment, even when the company that writes the control program of the PLC (for example, controller 300) and the company that reads the control program of the PLC differ, the execution-use control program can be read from and written into the PLC with an increased convenience while preventing the edit-use key necessary for deciphering the control program from leaking, thus protecting the control program securely.

Embodiment 3

This embodiment will be described in terms of differences from Embodiment 1. In this embodiment, a configuration, a process, a means, and a procedure which have the same function as that described in Embodiment 1 will be denoted by the same reference numerals, and their description may be omitted depending on the case.

Figure 11:
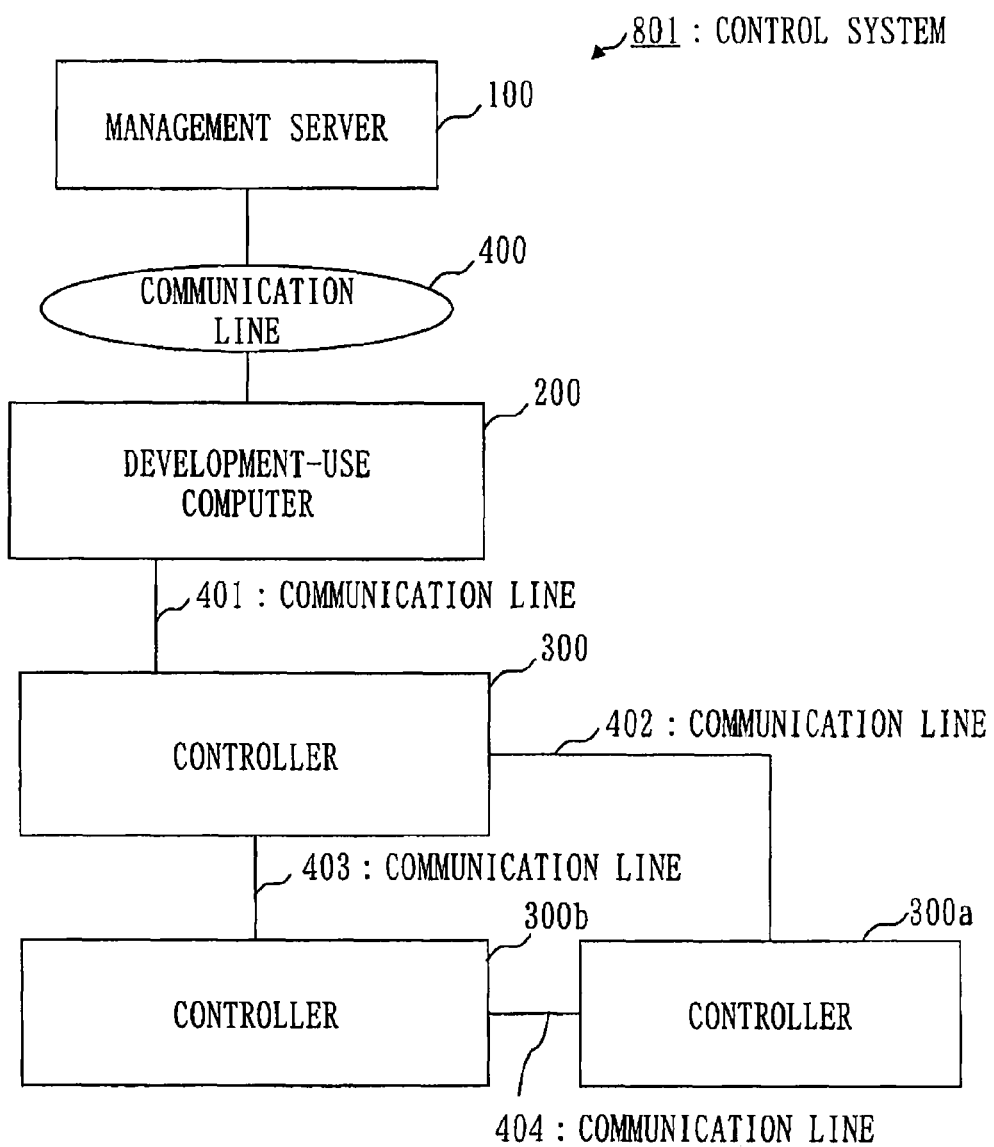
FIG. 11 is a block configuration diagram of a control system 801 according to Embodiment 3.
Figure 12:
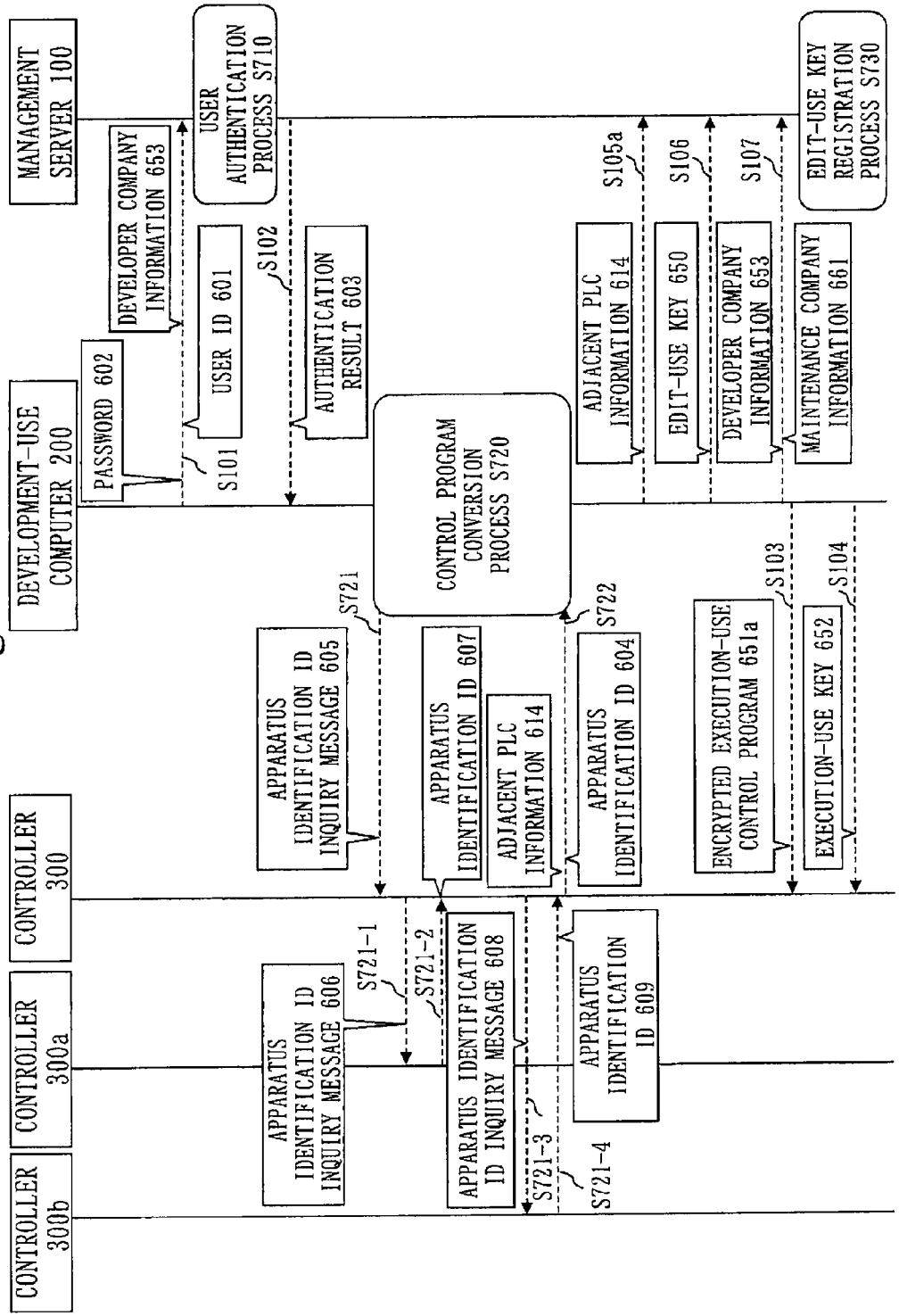
FIG. 12 is a sequence chart showing the procedure, in the control system 801 according to Embodiment 3, of writing an execution-use control program 651 from a development-use computer 200 into controllers 300, 300a, and 300b.

FIG. 11 is a block configuration diagram of a control system 801 according to this embodiment. FIG. 12 is a sequence chart showing the procedure in the control system 801 according to this embodiment, of writing an encrypted execution-use control program 651a from a development-use computer 200 into controllers 300, 300a, and 300b.

The procedure in the control system 801 according to this embodiment, of writing an execution-use control program 651 from the development-use computer 200 into the controllers 300, 300a, and 300b will be described with reference to FIGS. 11 and 12.

FIG. 11 corresponds to FIG. 1 described in Embodiment 1. The same functional configurations as those in FIG. 1 are denoted by the same reference numerals as in FIG. 1, and their description will be omitted. FIG. 12 corresponds to FIG. 5 described in Embodiment 1. The same functional configurations as those in FIG. 5 are denoted by the same reference numerals as in FIG. 5, and their description will be omitted.

As shown in FIG. 11, the control system 801 is different from the control system 800 described in Embodiment 1 in that the plurality of controllers 300a and 300b are connected to the controller 300 via communication lines 401, 402, 403, and 404.

As shown in FIG. 11, the controller 300 is connected to the controller 300a via the communication line 402. The controller 300 is also connected to the controller 300b via the communication line 403. The controller 300a and the controller 300b are connected to each other via the communication line 404.

The controllers 300a and 300b are examples of an adjacent connection device connected to the controller 300 (control device).

FIG. 12 indicates the process flow, upon reception of the execution-use control program writing request from the user, of the development-use computer 200 in the control system 801 from executing the process of writing the execution-use control program to the controller 300 up to writing the execution-use control program into the controller 300.

The procedure shown in FIG. 12 will be described.

S101 to S102 of FIG. 12 are the same processes as S101 to S102 of FIG. 5.

The development-use computer 200, when executing the process of writing the execution-use control program into the controller 300, first notifies the management server 100 of a user ID 601, a password 602, and developer company information 653 (S101).

Upon reception of the notice, the management server 100 executes a user authentication process S710 and responds to the development-use computer 200 with an authentication result 603 (S102).

A control program conversion process S720 of FIG. 12 is the same process as the control program conversion process S720 of FIG. 5.

A control program management part 202 of the development-use computer 200 receives the authentication result 603 from the management server 100 via a server communication part 203. The control program management part 202 then confirms the received authentication result 603. If the authentication result 603 is an authentication success, the control program management part 202 executes the control program conversion process S720.

Figure 13:
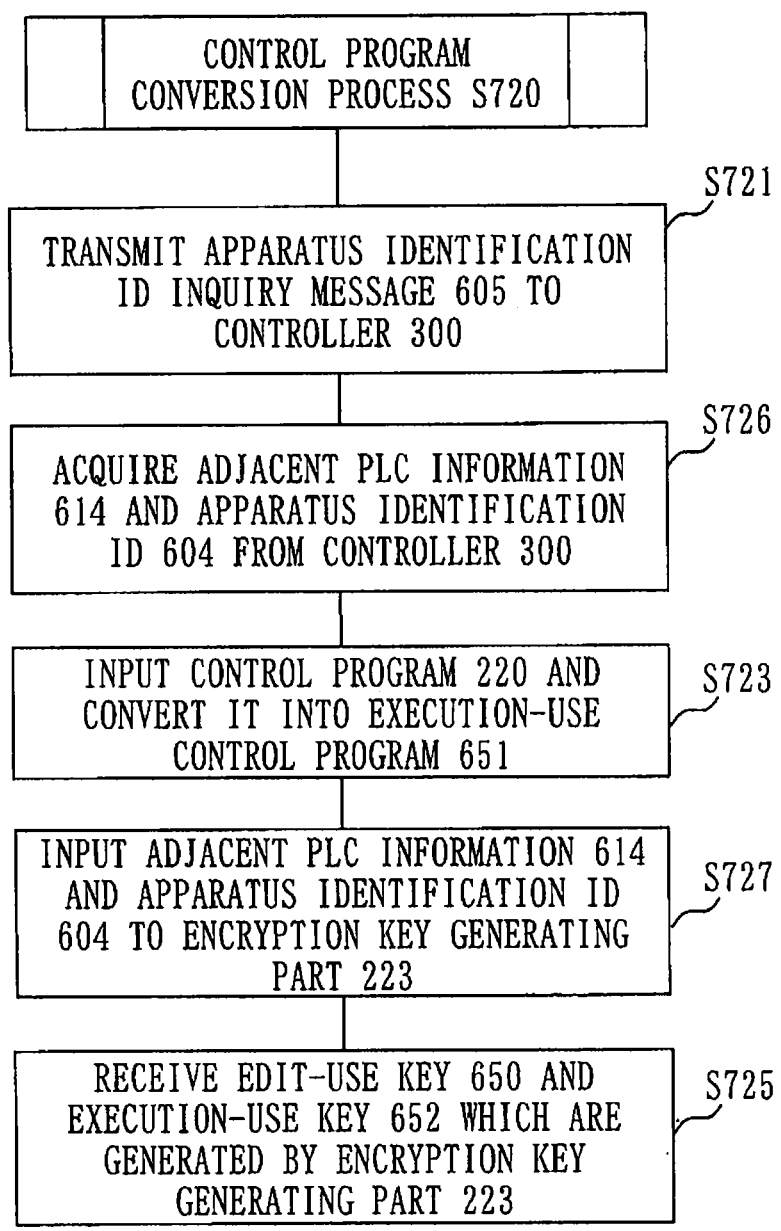
FIG. 13 is a flowchart showing the flow of a control program conversion process S720 of the development-use computer 200 according to Embodiment 3.

FIG. 13 is a flowchart showing the flow of the control program conversion process S720 of the development-use computer 200 according to this embodiment.

The control program conversion process S720 by the control program management part 202 of the development-use computer 200 will be described with reference to FIGS. 12 and 13.

S721 of FIG. 12 is the same process as S721 of FIGS. 5 and 7.

In S721 of FIG. 12, the control program management part 202 of the development-use computer 200 transmits an apparatus identification ID inquiry message 605 for the controller 300 to the controller 300 (S721).

Upon reception of the apparatus identification ID inquiry message 605, the controller 300 transmits apparatus identification ID inquiry messages 606 and 608 to the controllers 300a and 300b, respectively (S721-1, S721-3).

Upon reception of the apparatus identification ID inquiry message 606, the controller 300a notifies the controller 300 of an apparatus identification ID 607 of the controller 300a (S721-2). Upon reception of the apparatus identification ID inquiry message 608, the controller 300b notifies the controller 300 of an apparatus identification ID 609 of the controller 300b (S721-4).

Upon reception of the apparatus identification IDs 607 and 609 from the controllers 300a and 300b, the controller 300 generates, as adjacent PLC information 614, information on the controllers 300a and 300b (PLC) that are adjacent to the controller 300, based on the received apparatus identification IDs 607 and 609.

The adjacent PLC information 614 is an example of adjacent information including the connecting relation of the controller 300 (control device) with the controllers 300a and 300b (adjacent connection devices).

The controller 300 notifies the control program management part 202 of the development-use computer 200, of an apparatus identification ID 604 and the adjacent PLC information 614.

In this embodiment, a case is shown in which the adjacent PLC information 614 is generated by the controller 300. However, the development-use computer 200 can also generate the adjacent PLC information 614 by acquiring the apparatus identification ID 607 of the controller 300a and the apparatus identification ID 609 of the controller 300b.

In S726 of FIG. 13, the control program management part 202 of the development-use computer 200 receives the apparatus identification ID 604 and adjacent PLC information 614 from the controller 300.

S723 of FIG. 13 is the same process as S723 of FIG. 7.

In S723, the control program management part 202 converts a control program 220 into the execution-use control program 651 that can be executed in the controller 300.

In S727 of FIG. 13, the control program management part 202 inputs the adjacent PLC information 614 and the apparatus identification ID 604 to an encryption key generating part 223. The encryption key generating part 223 encrypts the execution-use control program 651 based on the adjacent PLC information 614 and apparatus identification ID 604, thus generating the encrypted execution-use control program 651a. Also, the encryption key generating part 223 generates the edit-use key 650 necessary for viewing the control program 220 and an execution-use key 652 necessary for executing the execution-use control program of the controller 300.

S725 of FIG. 13 is the same process as S725 of FIG. 7, and a description thereof will accordingly be omitted.

S103 to S104 of FIG. 12 are the same processes as S103 to S104 of FIG. 5.

A controller communication part 201 of the development-use computer 200 transmits the encrypted execution-use control program 651a and execution-use key 652 to the controller 300 (S103, S104).

The server communication part 203 of the development-use computer 200 transmits an edit-use key 650 and the adjacent PLC information 614 to the management server 100.

In S105a to S107 of FIG. 12, the server communication part 203 of the development-use computer 200 transmits the edit-use key 650, the adjacent PLC information 614, the developer company information 653, and maintenance company information 661 to the management server 100 via a communication line 400.

S105a to S107 of FIG. 12 are similar processes to S105 to S107 of FIG. 5 but are different in that the adjacent PLC information 614 is transmitted, in place of the apparatus identification ID 604, to the management server 100.

A user communication part 102 of the management server 100 receives the edit-use key 650, adjacent PLC information 614, developer company information 653, and maintenance company information 661 from the development-use computer 200. In the edit-use key registration process S730, the management server 100 registers the edit-use key 650, the adjacent PLC information 614, developer company information 653, and maintenance company information 661 in a user management table 101.

An edit-use key registration process S730 of the management server 100 is the same as the edit-use key registration process S730 of the management server 100 described with reference to FIG. 8, but is different in that the adjacent PLC information 614 is registered, in place of the apparatus identification ID 604, in an apparatus identification ID table 112.

As described above, the control system 801 according to this embodiment is a control system including the first controller (controller 300), the second controller (controller 300a) connected to the first controller via the third communication line (communication line 402), the first computer (development-use computer 200) which reads and writes the control program from and into the first controller, and the server (management server 100) connected to the first computer via the second communication line (communication line 400).

The control system 801 according to this embodiment includes a means that carries out the following process when writing the control program from the first computer into the first controller.

The server includes an authentication means for authenticating the user who writes using the first computer, and the belonging company of the user, and determining whether to give a writing permission to the computer.

The first controller includes a means for reading identification information concerning the second controller connected via the communication line, and generating adjacency information (adjacent PLC information 614) indicating that the first and second controllers are adjacent.

The first computer includes a means for reading the adjacency information from the first controller and generating an encryption key (edit-use key 650) for enabling viewing of the control program and an encryption key (execution-use key 652) for enabling execution of the control program.

The first computer also includes a means for writing the encryption key, generated by the key generation means and serving to enable viewing of the control program and execution of the control program, to the first controller.

The server includes a means for storing the belonging company information of the first computer, the adjacency information, and the encryption key for enabling viewing of the control program.

As described above, with the control system 801 according to this embodiment, the edit-use key necessary for viewing the control program can be acquired only when the adjacent PLC information indicating the combinations and connecting relations of a plurality of controllers (PLCs) matches the adjacent PLC information registered in the management server. Then, execution of the control program is permitted, thereby improving the confidentiality of the control program.

Embodiment 4

This embodiment will be described in terms of differences from Embodiments 1 to 3. In this embodiment, a configuration, a process, a means, and a procedure which have the same function as that described in Embodiments 1 to 3 will be denoted by the same reference numerals, and their description may be omitted depending on the case.

This embodiment will explain the process in the control system 801 described in Embodiment 3, from reading the encrypted execution-use control program 651*a* from the controller 300 up to converting the encrypted execution-use control program 651*a* into the viewable and editable control program 220, by the maintenance-use computer 250.

Figure 14:
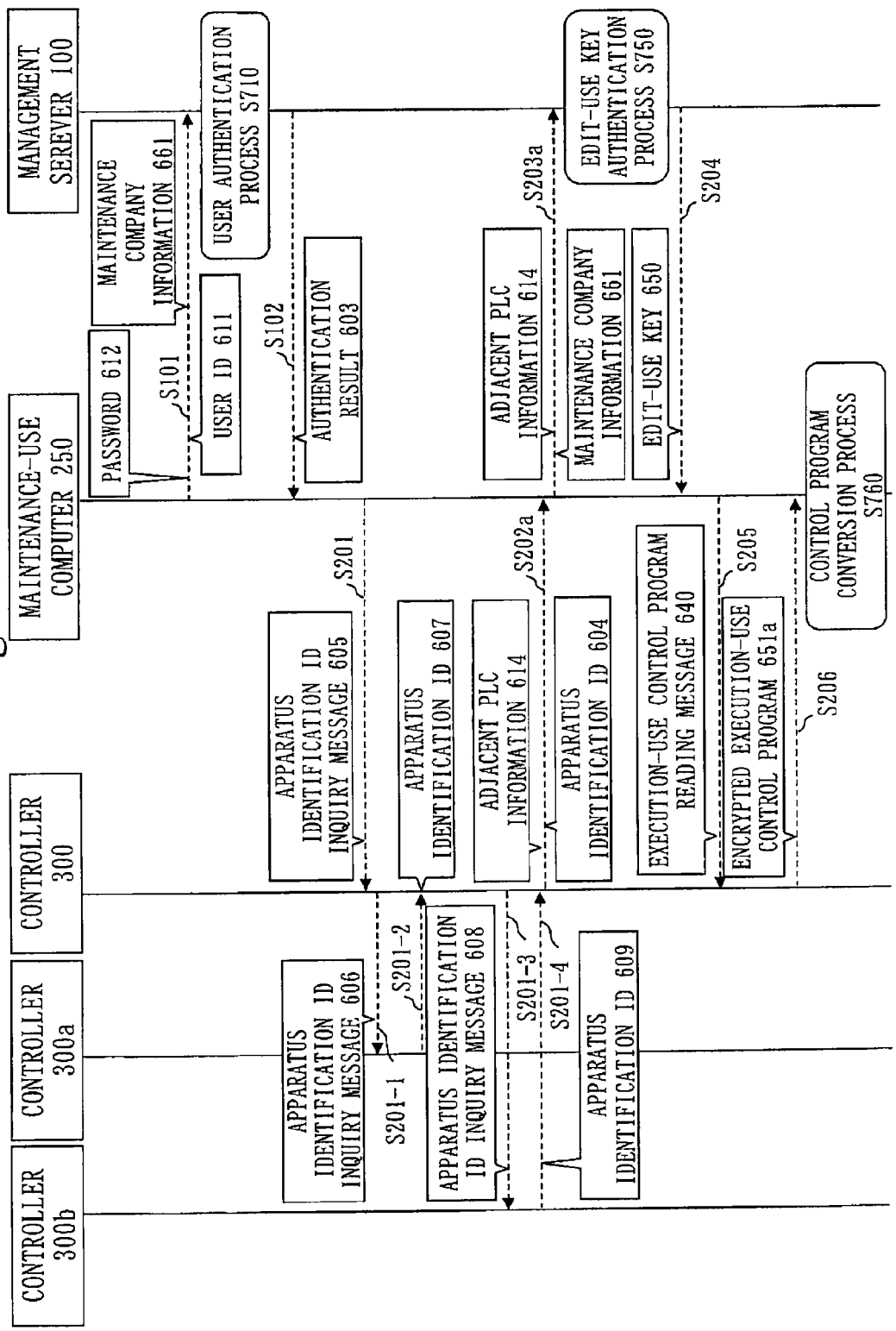
FIG. 14 is a sequence chart showing the procedure of reading an encrypted execution-use control program 651a from a controller 300 into a maintenance-use computer 250 in a control system 801 according to Embodiment 4.

FIG. 14 is a sequence chart showing the procedure in a control system 801 according to this embodiment, of reading an encrypted execution-use control program 651*a* from a controller 300 into a maintenance-use computer 250.

A procedure of the maintenance-use computer 250, from reading the encrypted execution-use control program 651*a* from the controller 300 up to converting the readout encrypted execution-use control program 651*a* into a viewable control program 220, will be described with reference to FIG. 14.

S101 to S102 of FIG. 14 are the processes which are the same as S101 to S102 of FIG. 9.

In S101 of FIG. 14, when the user executes, with the maintenance-use computer 250, the operation of reading the execution-use control program from the controller 300, the maintenance-use computer 250 notifies a management server 100 of a user ID 611, a password 612, and maintenance company information 661, and the management server 100 executes a user authentication process S710.

S201 of FIG. 14 is the same process as S201 of FIG. 9.

The control program management part 202 of the maintenance-use computer 250 confirms a received authentication result 603. If the authentication result 603 is an authentication success, the control program management part 202 transmits an apparatus identification ID inquiry message 605 to the controller 300 (S201).

Upon reception of apparatus identification ID inquiry message 605, the controller 300 transmits apparatus identification ID inquiry messages 606 and 608 to controllers 300*a* and 300*b*, respectively (S201-1, S201-3).

Upon reception of the apparatus identification ID inquiry message 606, the controller 300*a* notifies the controller 300 of an apparatus identification ID 607 of the controller 300*a* (S201-2).

Upon reception of the apparatus identification ID inquiry message 608, the controller 300*b* notifies the controller 300 of an apparatus identification ID 609 of the controller 300*b* (S201-4).

Upon reception of the apparatus identification IDs 607 and 609 from the controllers 300*a* and 300*b*, the controller 300 generates information of the controllers 300*a* and 300*b* which are adjacent to the controller 300, as adjacent PLC information 614, based on the received apparatus identification IDs 607 and 609.

In S202*a* of FIG. 14, the controller 300 notifies the control program management part 202 of the development-use computer 200, of the adjacent PLC information 614 together with the apparatus identification ID 604 of the controller 300.

In S203*a* of FIG. 14, the control program management part 202 of the maintenance-use computer 250 notifies the management server 100 of the acquired adjacent PLC information 614, and maintenance company information 661.

Upon reception of the adjacent PLC information 614 and maintenance company information 661 from the maintenance-use computer 250, the management server 100 executes an edit-use key authentication process S750.

The edit-use key authentication process S750 by the management server 100 is the same process as the edit-use key authentication process S750 described in FIGS. 9 and 10 except that in this embodiment, the management server 100 searches an apparatus identification ID table 112 using the adjacent PLC information 614 in place of the apparatus identification ID 604, to acquire the edit-use key 650.

The processes of S204 to S206 and the process of the control program conversion process S760 of FIG. 14 are the same as the processes of S204 to S206 and the process of the control program conversion process S760 of FIG. 9.

In the edit-use key authentication process S750 of the management server 100 according to this embodiment, the management server 100 checks the adjacent PLC information 614, with the maintenance company information 661. If there are adjacent PLC information 614 and maintenance company information 661 that match each other, the management server 100 searches for an edit-use key 650 corresponding to the adjacent PLC information 614, and transmits the obtained edit-use key 650 to the maintenance-use computer 250 (S204).

Upon reception of the edit-use key 650, the maintenance-use computer 250 reads the encrypted execution-use control program 651*a* from the controller 300 (S205, S206).

The maintenance-use computer 250 receives, with a decryption part 224, the edit-use key 650 as input, to decrypt information necessary for viewing the encrypted execution-use control program 651*a*, and converts the execution-use control program 651 into the viewable control program 220.

A control program conversion process S760 of FIG. 14 is the same as the control program conversion process S760 of FIG. 9, and a description thereof will accordingly be omitted.

As described above, the control system 801 according to this embodiment includes the following means used when reading the control program 220 from the first controller (controller 300) using the computer (maintenance-use computer 250).

The server (management server 100) includes an authentication means which, using the computer, authenticates the user ID of the user who executes the writing operation, and the belonging company of the user, and determines whether to give a writing permission to the computer.

The first controller includes a means for reading identification information (apparatus identification ID) concerning the second controller (controller 300*a*) connected via the communication line, and generating adjacency information (adjacent PLC information 614) indicating that the first and second controllers are adjacent.

The computer includes a means for notifying the server of the adjacency information from the first controller.

The server includes a means for transmitting, upon reception of the adjacency information from the computer, an encryption key (edit-use key 650) for enabling viewing of the control program corresponding to the adjacency information, to the computer.

The computer includes a means for reading, upon reception of the encryption key from the server, the control program from the first controller and enabling, using the encryption key, viewing of the control program.

As described above, with the control system 801 according to this embodiment, the edit-use key necessary for viewing the control program can be acquired and execution of the control program is permitted only when the adjacent PLC information indicating the combinations and connecting relations of a plurality of controllers (PLCs) matches the adjacent PLC information registered in the management server. Then, the confidentiality of the control program can be improved.

With the control system 801 according to this embodiment, even when the company that writes the control program of the PLC and the company that reads the execution-use control program from the PLC differ, the execution-use control program can be read from and written into the PLC with an increased convenience Embodiment 5

This embodiment will be described mainly in terms of differences from Embodiments 1 to 4. Particularly, this embodiment will be described in terms of differences from Embodiment 1. In this embodiment, a configuration, a process, a means, and a procedure which have the same function as that described in Embodiment 1 will be denoted by the same reference numerals, and their description may be omitted depending on the case.

Figure 15:
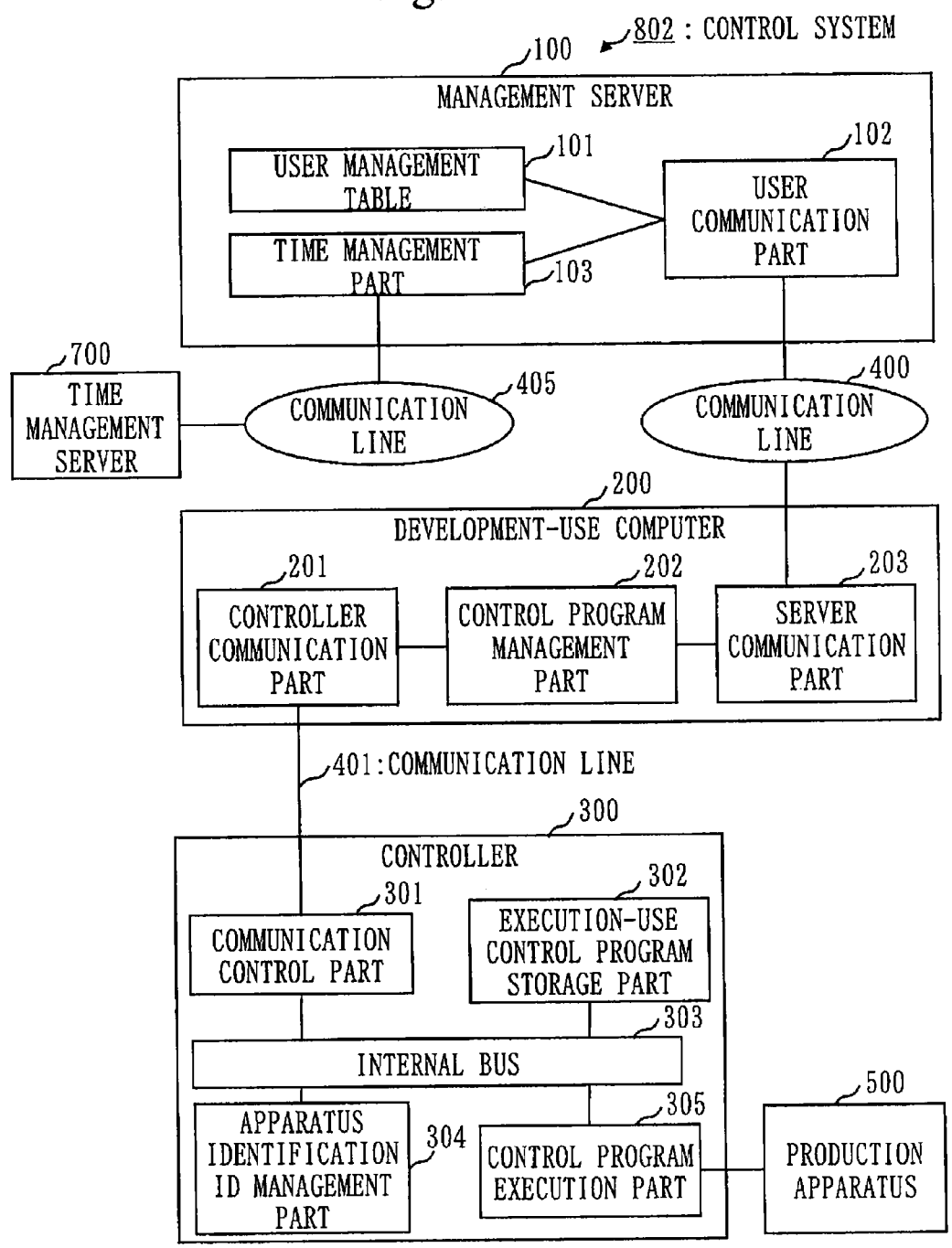
FIG. 15 is a block configuration diagram of a control system 802 according to Embodiment 5.
Figure 16:
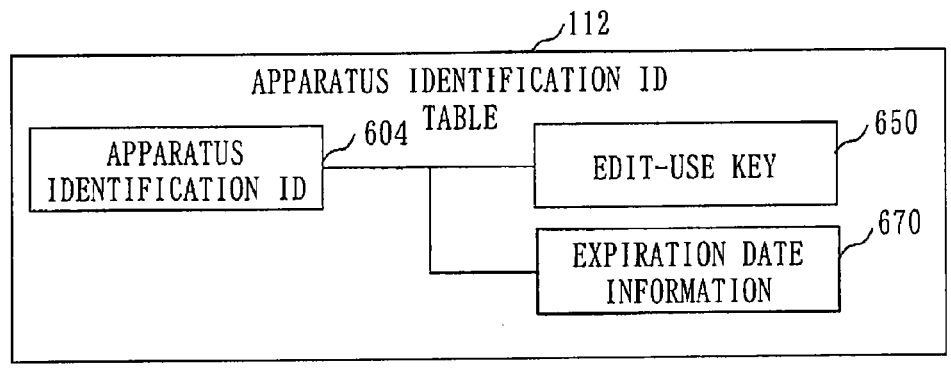
FIG. 16 is a configuration diagram of an apparatus identification ID table 112 provided to a management server 100 according to Embodiment 5.
Figure 17:
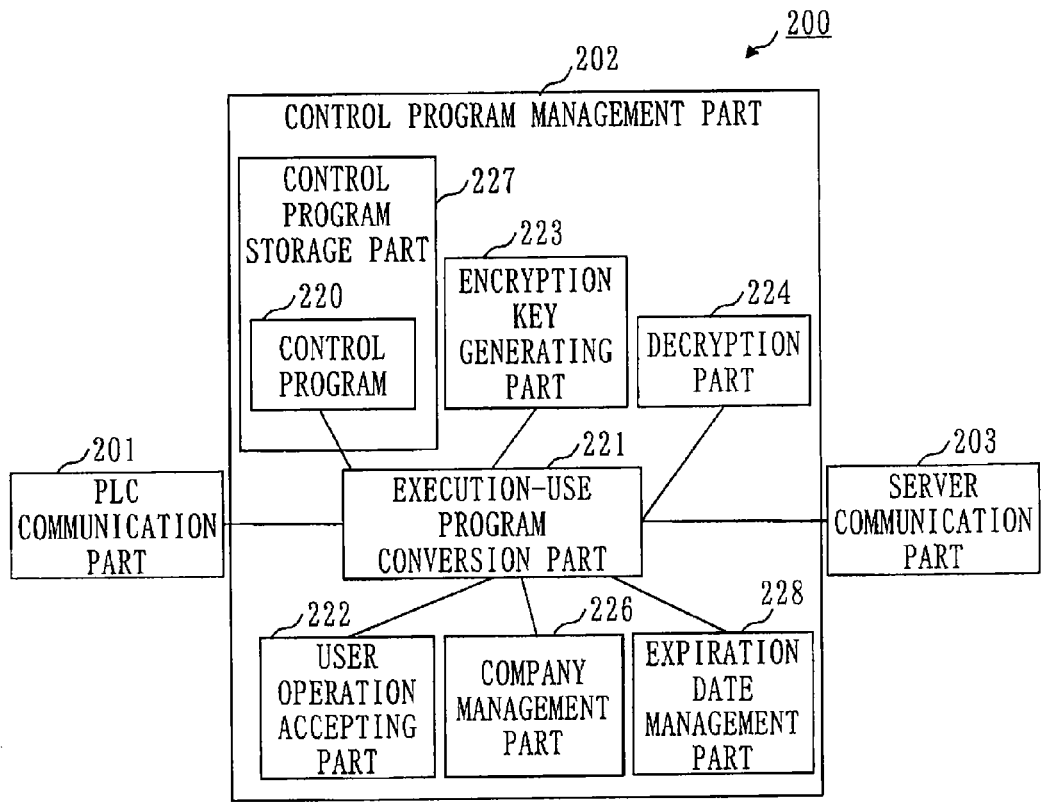
FIG. 17 is a detailed block configuration diagram of a development-use computer 200 according to Embodiment 5.
Figure 18:
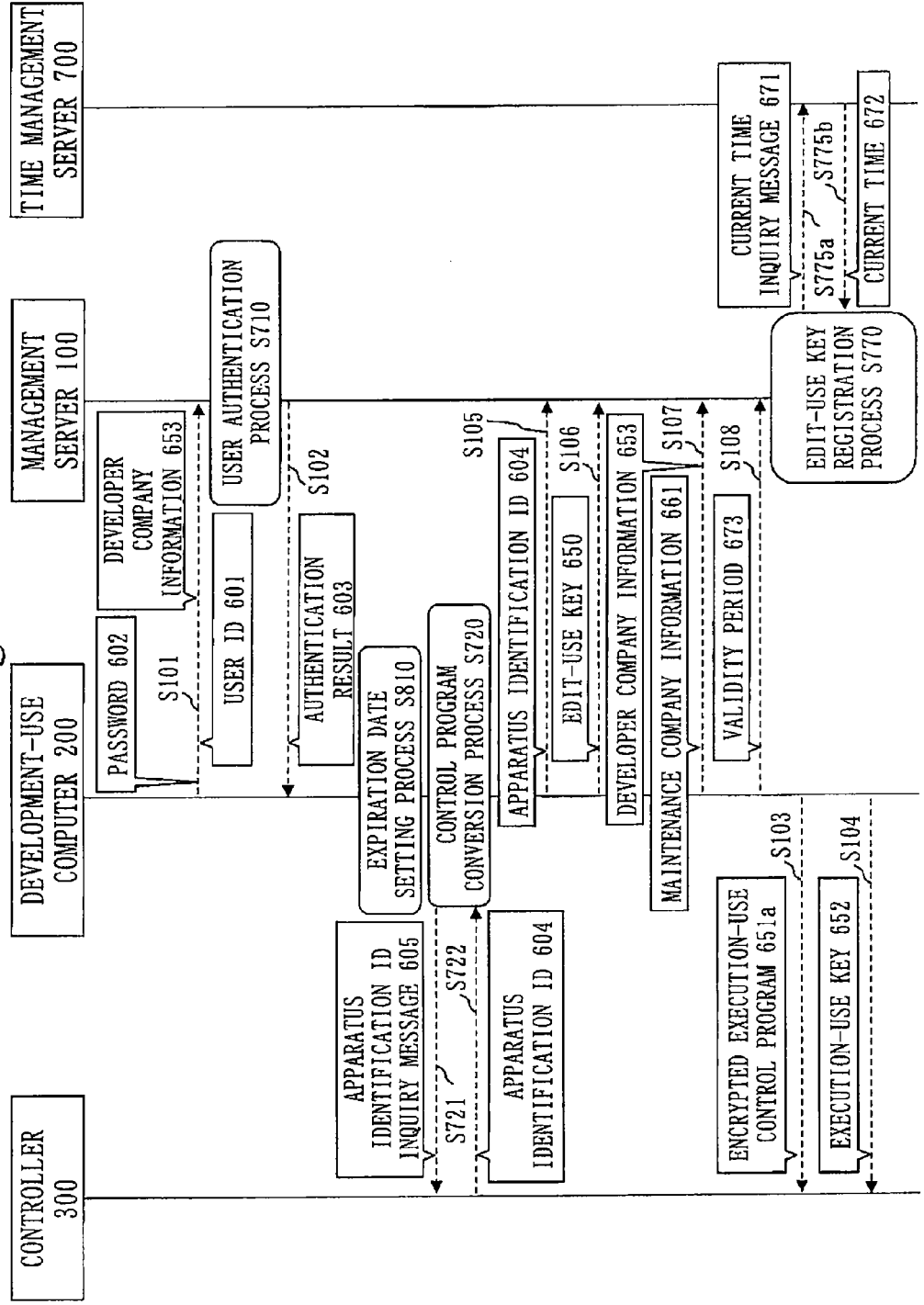
FIG. 18 is a sequence chart showing the procedure of writing an execution-use control program 651 from the development-use computer 200 into a controller 300 in the control system 802 according to Embodiment 5.

FIG. 15 is a block configuration diagram of a control system 802 according to this embodiment. FIG. 16 is a configuration diagram of an apparatus identification ID table 112 provided to a management server 100 according to this embodiment. FIG. 17 is a detailed block configuration diagram of a development-use computer 200 according to this embodiment. FIG. 18 is a sequence chart showing a procedure in the control system 802 according to this embodiment, of writing an execution-use control program 651 from the development-use computer 200 into a controller 300.

FIGS. 15 to 17 correspond to FIGS. 1 to 3 described in Embodiment 1. The functional configurations which are the same as those in FIGS. 1 to 3 are denoted by the same reference numerals as in FIGS. 1 to 3, and their description will be omitted depending on the case. FIG. 18 corresponds to FIG. 5 described in Embodiment 1. The functional configurations which are the same as those in FIG. 5 are denoted by the same reference numerals as in FIG. 5, and their description will be omitted depending on the case.

As shown in FIG. 15, the management server 100 includes a time management part 103.

The time management part 103 manages the expiration date of an encryption key (edit-use key 650). The time management part 103 is connected to a time management server 700 (current time management server) via a communication line 405.

As shown in FIG. 16, the apparatus identification ID table 112 of the management server 100 includes, as information corresponding to an apparatus identification ID 604, expiration date information 670 in addition to the edit-use key 650. The expiration date information 670 is information indicating the expiration date of the corresponding edit-use key 650.

As shown in FIG. 17, a control program management part 202 includes an expiration date management part 228 in addition to the functional configuration described in Embodiment 1.

The expiration date management part 228 manages the expiration date which is set by the user.

FIG. 18 indicates the process flow of the development-use computer 200 in the control system 802, from executing the process of writing the execution-use control program into the controller 300 up to writing the execution-use control program into the controller 300.

First, the procedure of writing the execution-use control program of the control program from the development-use computer 200 will be described with reference to FIG. 18.

S101 to S102 of FIG. 18 are the same processes as S101 to S102 of FIG. 5.

When accepting the execution-use control program writing request for the controller 300 from the user, first, the development-use computer 200 notifies the management server 100 of a user ID 601, a password 602, and developer company information 653 which are entered by the user (S101).

Upon acceptance of the notice, the management server 100 executes a user authentication process S710 and responds to the development-use computer 200 with an authentication result 603 (S102).

The development-use computer 200 receives the authentication result 603 from the management server 100. If the content of the authentication result 603 is an authentication success, the development-use computer 200 executes an expiration date setting process S810.

Figure 19:
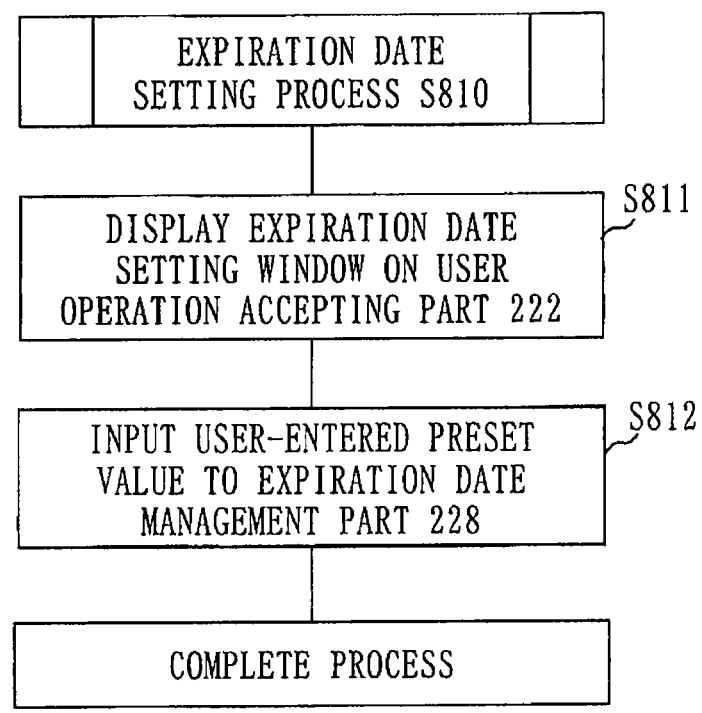
FIG. 19 is a flowchart showing the flow of an expiration date setting process S810 of the development-use computer 200 according to Embodiment 5.

FIG. 19 is a flowchart showing the flow of the expiration date setting process S810 of the development-use computer 200 according to this embodiment.

The expiration date setting process S810 of the development-use computer 200 will be described with reference to FIG. 19.

In S811, an execution-use program conversion part 221 notifies a user operation accepting part 222 of a message requesting to enter the expiration date. The user operation accepting part 222 displays on the display screen of the development-use computer 200 the message prompting the user to enter the expiration date (expiration date setting window).

In S812, the user operation accepting part 222 notifies the execution-use program conversion part 221 of the input value entered in the expiration date setting window by the user. Upon accepting the notice of the input value, the execution-use program conversion part 221 updates the preset value of the expiration date management part 228 by the input value, thereby setting a validity period 673.

The user operation accepting part 222 is an example of the transmission-side accepting part which accepts input of the validity period of the edit-use key 650.

Subsequently, the development-use computer 200 executes a control program conversion process S720. The control program conversion process S720 of FIG. 18 is the same process as the control program conversion process S720 of FIG. 5, and a description thereof will accordingly be omitted.

Then, the development-use computer 200 executes the processes of S103 to S108. The processes of S103 to S107 of FIG. 18 are processes which are the same as S103 to S107 of FIG. 5.

When the control program conversion process S720 is completed, a server communication part 203 of the development-use computer 200 transmits the edit-use key 650, developer company information 653 (maintenance company information 661), and apparatus identification ID 604 to the management server 100 (S105 to S107).

The server communication part 203 of the development-use computer 200 also transmits the encrypted execution-use control program 651 a and the execution-use key 652 to the controller 300 (S103 to S104).

In S108, the server communication part 203 of the development-use computer 200 transmits the validity period 673 to the development-use computer 200, in addition to the edit-use key 650, developer company information 653 (maintenance company information 661), and apparatus identification ID 604.

The management server 100 receives the edit-use key 650, developer company information 653 (maintenance company information 661), apparatus identification ID 604, and validity period 673 from the development-use computer 200. Upon reception of the edit-use key 650, developer company information 653 (maintenance company information 661), apparatus identification ID 604, and validity period 673 from the development-use computer 200, the management server 100 executes an edit-use key registration process S770.

Figure 20:
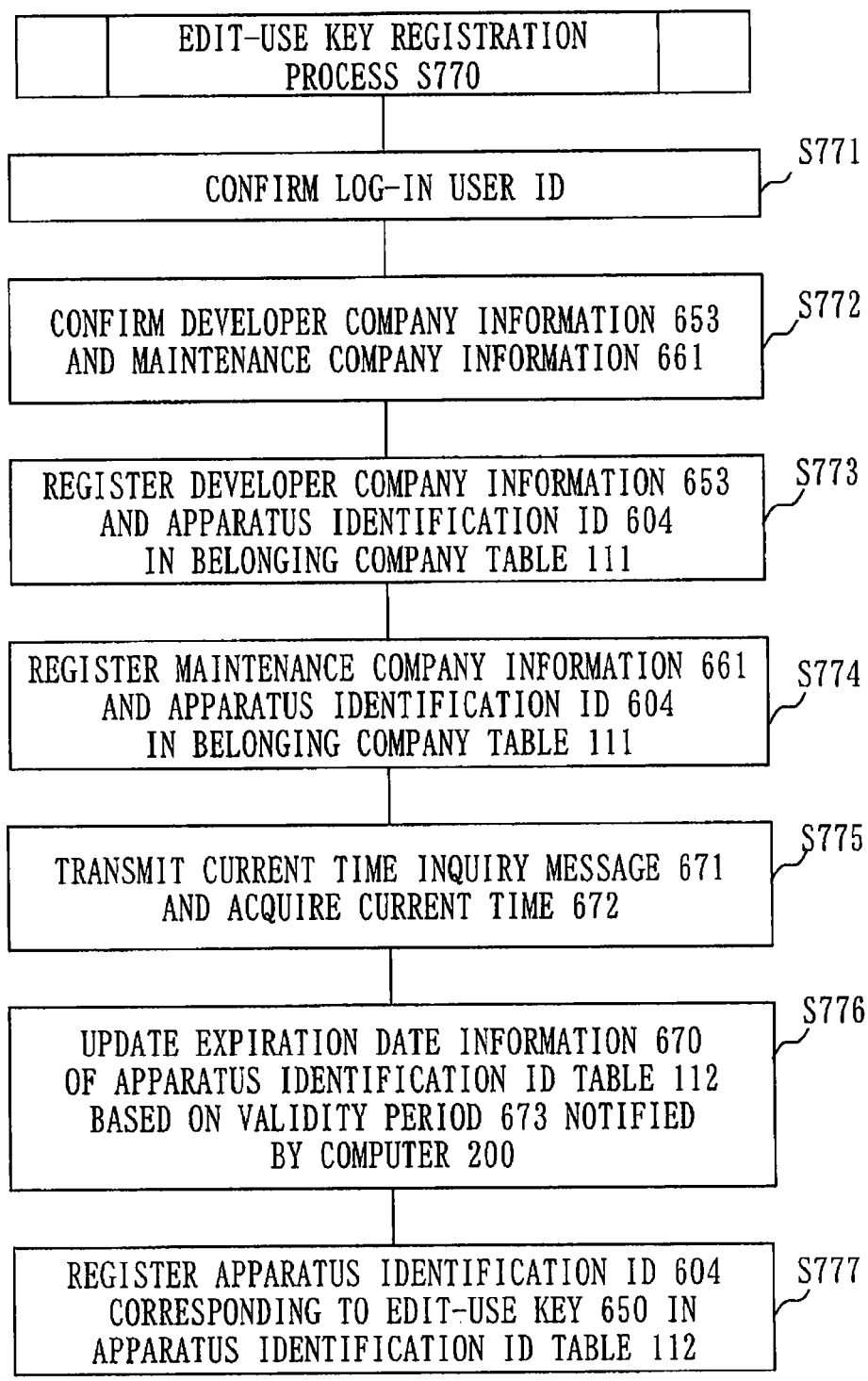
FIG. 20 is a flowchart showing the flow of an edit-use key registration process S770 of the management server 100 according to Embodiment 5.

FIG. 20 is a flowchart showing the flow of the edit-use key registration process S770 of the management server 100 according to this embodiment.

The edit-use key registration process S770 of the management server 100 will be described with reference to FIG. 20.

In S771 to S772, the management server 100 checks with the processing device whether or not the log-in user corresponds to the received developer company information 653 and maintenance company information 661, based on a user table 110.

If it is determined that the user ID corresponds to the received developer company information 653 and maintenance company information 661, the management server 100 forwards the process to S773.

If it is determined that the user ID does not correspond to the received developer company information 653 and maintenance company information 661, the management server 100 ends the process.

In S773, the management server 100 registers the developer company information 653 and an apparatus identification ID 604 in correspondence with each other in a belonging company table 111. This process is the same as the process of S731 of FIG. 8.

In S774, the management server 100 registers the maintenance company information 661 and the apparatus identification ID 604 in correspondence with each other in the belonging company table 111. This process is the same as the process of S732 of FIG. 8.

In S775, the management server 100 transmits a current time inquiry message 671 to the time management server 700 (S775a). Upon reception of the current time inquiry message 671 from the management server 100, the time management server 700 transmits current time 672 to the management server 100 (S775b).

In S776, using the processing device, the management server 100 adds the validity period 673 received from the development-use computer 200, to the current time 672 acquired from the time management server 700, thus obtaining the expiration date information 670 (expiration date).

The management server 100 sets the edit-use key 650 received from the development-use computer 200 and the calculated expiration date information 670, in the apparatus identification ID table 112 so as to be related to the apparatus identification ID 604 received from the development-use computer 200. If the record of the received apparatus identification ID 604 is already set in the apparatus identification ID table 112, the management server 100 updates the edit-use key 650 and the expiration date information 670.

Figure 21:
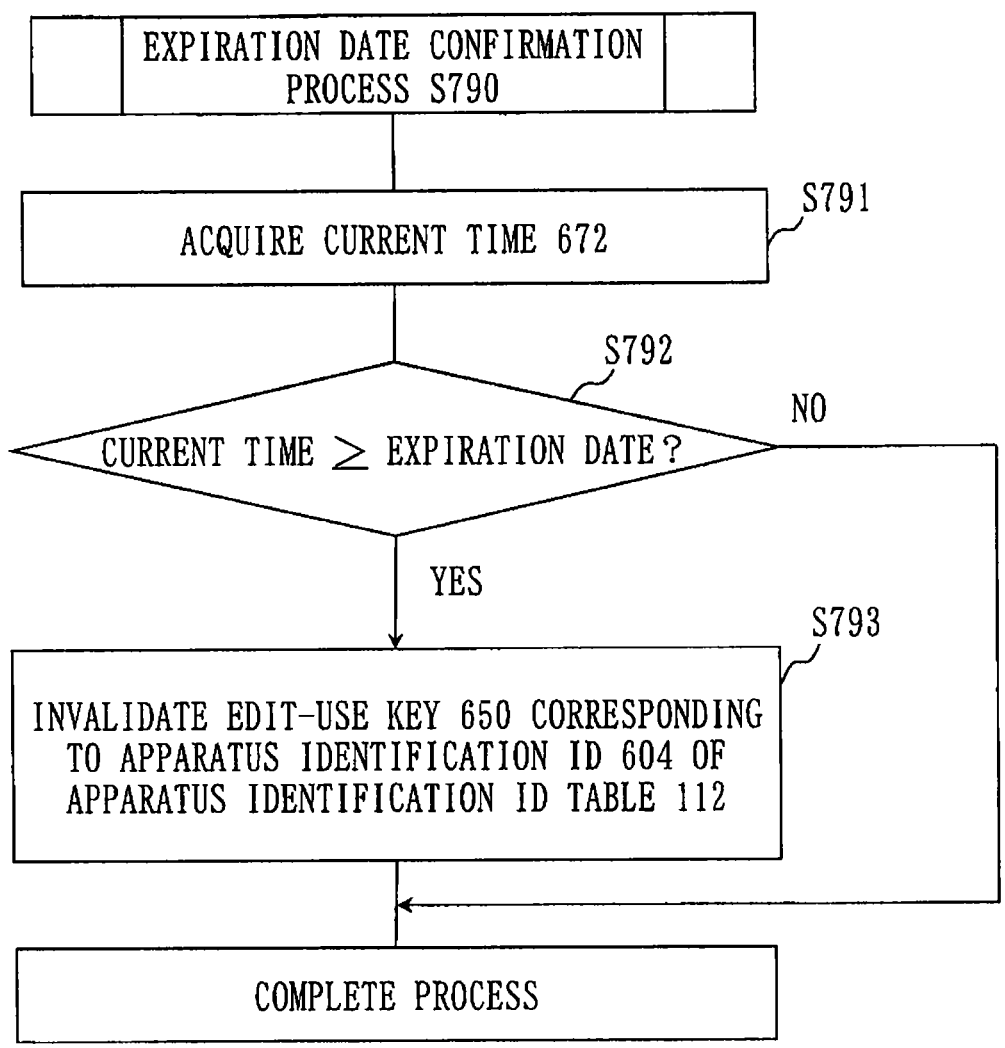
FIG. 21 is a flowchart showing the flow of an expiration date confirmation process S790 of the management server 100 according to Embodiment 6.

FIG. 21 is a flowchart showing the flow of an expiration date confirmation process S790 of the management server 100 according to this embodiment.

The management server 100 executes the expiration date confirmation process S790 shown in FIG. 21 regularly or irregularly.

In S791, the management server 100 transmits the current time inquiry message 671 to the time management server 700 and acquires the current time 672 from the time management server 700.

In S792, the management server 100 determines with the processing device whether or not the acquired current time 672 has reached the expiration date indicated by the expiration date information 670.

If it is determined that the current time 672 has reached the expiration date indicated by the expiration date information 670 (YES in S792), the management server 100 forwards the process to S793.

In S793, the management server 100 invalidates the edit-use key 650 for a record where the current time 672 has reached the expiration date indicated by the expiration date information 670. The management server 100, for example, sets "NULL" in the blank of the edit-use key 650 of the apparatus identification ID table 112, thereby invalidating the edit-use key 650.

If it is determined that the current time 672 has not reached yet the expiration date indicated by the expiration date information 670 (NO in S792), the management server 100 ends the process. The management server 100 executes this expiration date confirmation process S790 for every record of the apparatus identification ID table 112.

As described above, the control system 802 according to this embodiment includes the time management server 700 connected to the server (management server 100) via the fourth communication line (communication line 405).

The control system 802 according to this embodiment also has the following means.

The server includes a means for acquiring the current time from the time server (time management server 700) and adding the time notified of by the first computer (development-use computer 200) to the current time, thereby setting the expiration date concerning the encryption key (edit-use key 650).

The server includes a means for deleting the encryption key at the lapse of a preset expiration date.

As described above, the control system 802 according to this embodiment can control the expiration date for the key that is necessary for viewing and executing the control program. Thus, the control system 802 serves as a means that is effective for protecting the control program from illegal operation to the computer in an environment where the network quality is poor and the computer for viewing and editing the control program cannot always be connected to the network.

With the control system 802 according to this embodiment, the edit-use key necessary for deciphering the control program can be prevented from leaking.

Embodiment 6

This embodiment will be described mainly in terms of differences from Embodiments 1 to 5. Particularly, this embodiment will be described in terms of differences from Embodiments 2 and 5. In this embodiment, a configuration, a process, a means, and a procedure which have the same function as that described in Embodiments 2 and 5 will be denoted by the same reference numerals, and their description may be omitted depending on the case.

Figure 22:
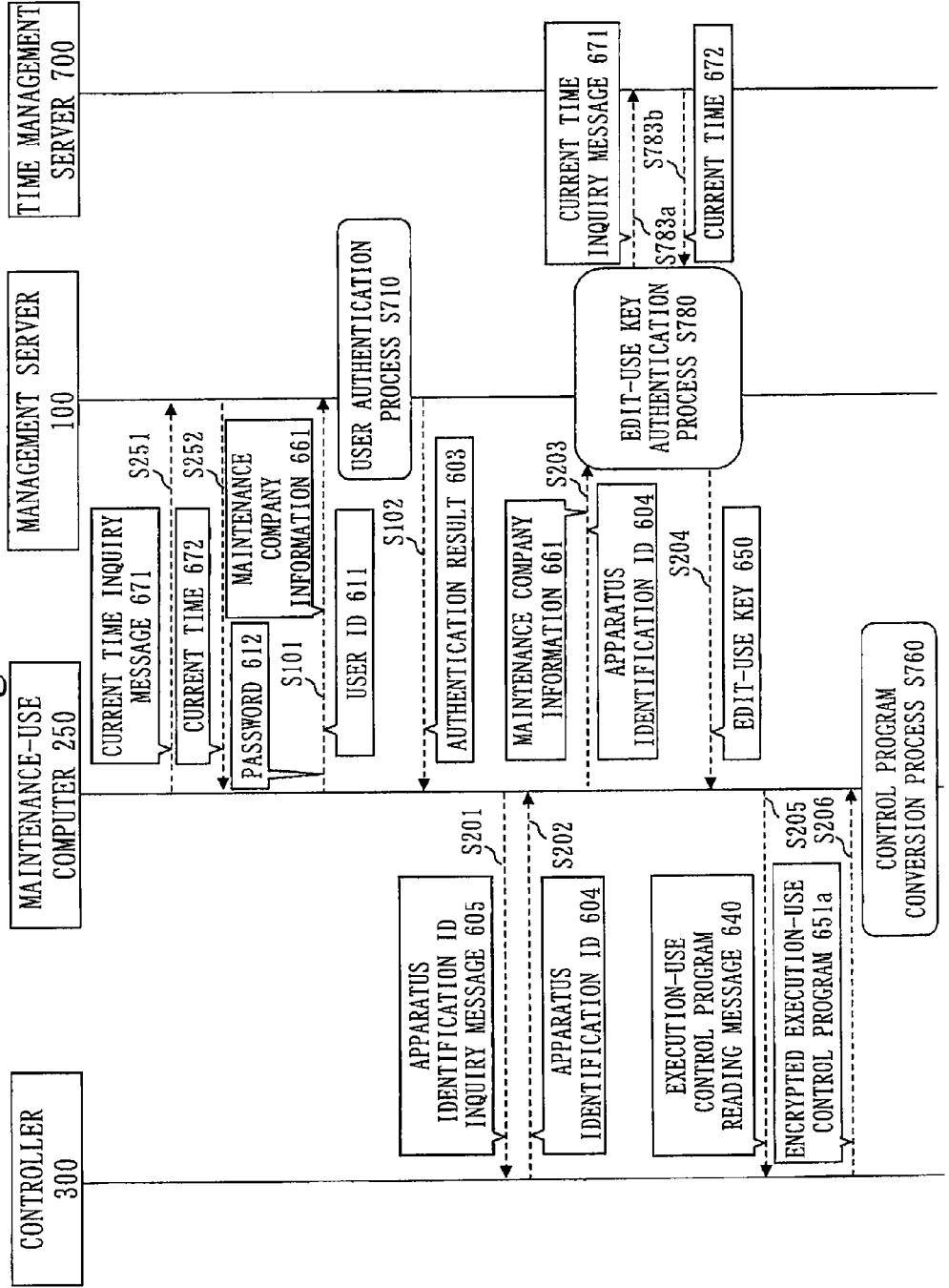
FIG. 22 is a sequence chart showing the procedure of writing an execution-use control program 651 from a development-use computer 200 into a controller 300 in a control system 802 according to Embodiment 6.
Figure 23:
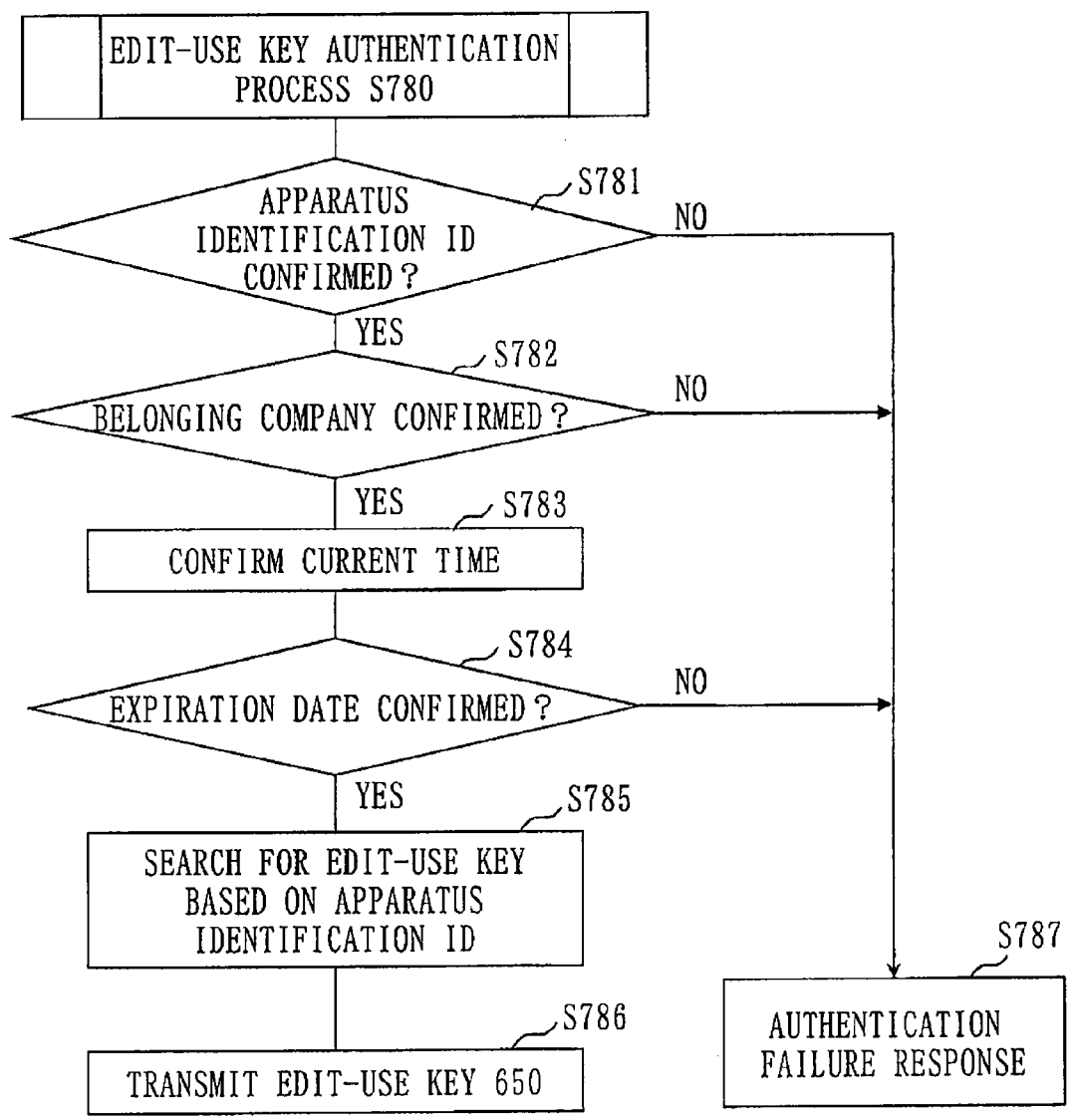
FIG. 23 is a flowchart showing the flow of an edit-use key authentication process S780 of a management server 100 according to Embodiment 6.

FIG. 22 is a sequence chart showing the procedure in a control system 802 according to this embodiment, of reading an encrypted execution-use control program 651a from a controller 300 into a maintenance-use computer 250. FIG. 23 is a flowchart showing the flow of an edit-use key authentication process S780 of a management server 100 according to this embodiment.

This embodiment will explain a process in the control system 802 described in Embodiment 5, from reading the encrypted execution-use control program 651a from the controller 300 up to converting the readout encrypted execution-use control program 651a into the viewable and editable control program 220 by the maintenance-use computer 250.

The control system 802 according to this embodiment includes a maintenance-use computer 250 in addition to the control system 802 described in Embodiment 5.

The internal configuration of the maintenance-use computer 250 has the same internal configuration as that of the development-use computer 200 described in Embodiment 5.

An apparatus identification ID table 112 stored in the management server 100 of this embodiment is the apparatus identification ID table 112 described in FIG. 16 of Embodiment 5.

In S251 of FIG. 22, the maintenance-use computer 250 transmits a current time inquiry message 671 to the management server 100.

In S252 of FIG. 22, upon reception of the current time inquiry message 671, the management server 100 transmits current time 672 to the maintenance-use computer 250.

Upon reception of the current time 672 from the management server 100, the maintenance-use computer 250 adjusts the time of the maintenance-use computer 250 to the current time 672. Hence, even when the time of the maintenance-use computer 250 has been altered, the time difference with respect to the expiration date can be controlled correctly.

The processes of S101 to S102, a user authentication process S710, and the processes of S201 to S206 of FIG. 22 are the same as the processes of S101 to S102, the user authentication process S710, and the processes of S201 to S206 of FIG. 9.

When the current time setting is completed, the maintenance-use computer 250 notifies the management server 100 of a user ID 611, a password 612, and maintenance company information 661 (S101).

The management server 100 executes the user authentication process S710. The maintenance-use computer 250 receives an authentication result 603 from the management server 100 (S102). If the authentication result 603 is an authentication success response, the maintenance-use computer 250 acquires an apparatus identification ID 604 from the controller 300 (S201 to S202).

Upon acquisition of the apparatus identification ID 604, the maintenance-use computer 250 transmits the apparatus identification ID 604 and the maintenance company information 661 to the management server 100 (S203). Upon reception of the apparatus identification ID 604 and the maintenance company information 661 from the maintenance-use computer 250, the management server 100 executes the edit-use key authentication process S780.

FIG. 23 is a flowchart showing the flow of the edit-use key authentication process S780 of the management server 100 according to this embodiment.

The edit-use key authentication process S780 of the management server 100 will be described with reference to FIG. 23.

In S781, the management server 100 checks, with the processing device, whether or not the received apparatus identification ID 604 is registered in the apparatus identification ID table 112 (see FIG. 3).

If it is confirmed that the apparatus identification ID 604 is registered in the apparatus identification ID table 112 (YES in S781), the management server 100 forwards the process to S782.

If it is confirmed that the received apparatus identification ID 604 is not registered in the apparatus identification ID table 112 (NO in S781), the management server 100 forwards the process to S787.

In S782, the management server 100 determines with the processing device whether or not the received maintenance company information 661 is registered in a belonging company table 111 and corresponds to the received apparatus identification ID 604.

If it is confirmed that the received maintenance company information 661 is registered in the belonging company table 111 and corresponds to the received apparatus identification ID 604 (YES in S782), the management server 100 forwards the process to S783.

If it is confirmed that the received maintenance company information 661 is not registered in the belonging company table 111 or does not correspond to the received apparatus identification ID 604 (NO in S782), the management server 100 forwards the process to S787.

In S783, the management server 100 transmits a current time inquiry message 671 to a time management server 700 (S783a). Upon reception of the current time inquiry message 671 from the management server 100, the time management server 700 transmits the current time 672 to the management server 100 (S783b).

In S784, the management server 100 searches the apparatus identification ID table 112 with the processing device based on the received apparatus identification ID 604, and acquires expiration date information 670. The management server 100 confirms the acquired expiration date information 670 and determines with the processing device whether or not the current time has reached the expiration date indicated by the expiration date information 670.

If it is determined that the current time has reached the expiration date (NO in S784), the management server 100 forwards the process to S787.

If it is determined that the current time has not reached yet the expiration date (YES in S784), the management server 100 forwards the process to S785.

In S785, the management server 100 searches the apparatus identification ID table 112 with the processing device based on the received apparatus identification ID 604. The management server 100 acquires an edit-use key 650 corresponding to the apparatus identification ID 604 from the apparatus identification ID table 112.

In S786, the management server 100 sets the acquired edit-use key 650 in the key authentication response.

In S204 of FIG. 22, the management server 100 transmits the key authentication response in which the edit-use key 650 is set, to the maintenance-use computer 250.

In S787, the management server 100 sets "authentication failure" in the key authentication response. More specifically, for example, if the apparatus identification ID 604 does not exist in the apparatus identification ID table 112, if the apparatus identification ID 604 and the maintenance company information 661 do not match each other in the belonging company table 111, or if the current time has reached the expiration date stored in the apparatus identification ID table, the management server 100 sets "authentication failure" in the key authentication response.

The explanation of the edit-use key authentication process S780 of the management server 100 is concluded.

As described above, upon reception of the apparatus identification ID from the server-side communication part (reception-side communication part), the management server 100 acquires an expiration date corresponding to the received apparatus identification ID, and acquires the current time from the time management server 700, to determine with the processing device whether or not the acquired current time passes the expiration date. If it is determined that the acquired current time passes the expiration date, the management server 100 deletes the edit-use key. If it is determined that the acquired current time does not pass the expiration date, the management server 100 acquires the edit-use key. The management server 100 is an example of an edit-use key acquisition part.

A user communication part 102 (server-side communication part) transmits the edit-use key acquired by the management server 100 (edit-use key acquisition part) to the maintenance-use computer (program reception device).

As described above, the control system 802 according to this embodiment includes the time management server 700 connected to the server (management server 100) via the fourth communication line (communication line 405).

The control system 802 according to this embodiment also includes the following means.

The second computer (maintenance-use computer 250) includes a means for acquiring the current time from the server and adjusting the current time to the current time of the server.

The server includes a means for acquiring the current time from the management server and confirming the expiration date concerning the encryption key (edit-use key).

The server includes a means for permitting transmission of the encryption key in a case where the expiration date is after the current time.

As described above, the control system 802 according to this embodiment can control the expiration date for the key that is necessary for viewing and executing the control program. Thus, the control system 802 serves as a means that is effective for protecting the control program from illegal operation to the computer in an environment where the network quality is poor and the computer for viewing and editing the control program cannot always be connected to the network. With this technique as well, the edit-use key necessary for deciphering the control program can be prevented from leaking, thus protecting the control program securely. Also, even when the company that writes the control program of the PLC and the company that reads the control program of the PLC differ, the execution-use control program can be read from and written into the PLC with an increased convenience.

Embodiments 1 to 6 have been described. Of these embodiments, two or more may be practiced by combination, one may be practiced partly, or two or more may be practiced by combination in part. The present invention is not limited to these embodiments, but various changes may be made where necessary.

In the explanation of Embodiments 1 to 6, the "controller communication part", the "control program management part", the "server communication part", the "execution-use program conversion part", the "user operation accepting part", the "encryption key generating part", the "decryption part", and the "company management part", respectively serving as independent functional blocks constitute the development-use computer 200. However, the configuration is not limited to this. For example, the "controller communication part" and the "server communication part" may be implemented by one functional block, and the "execution-use program conversion part" and the "encryption key generating part" may be implemented by one functional block. Alternatively, the development-use computer 200 may be constituted by any other combination of these functional blocks.

Likewise, the management server 100, the maintenance-use computer 250 or the controller 300 may be constituted by any combination of the functional blocks.

REFERENCE SIGNS LIST

100: management server; 101: user management table; 102: user communication part; 103: time management part; 110: user table; 111: belonging company table; 112: apparatus identification ID table; 150: user ID; 151: log-in information; 152: password; 160: user ID; 161: log-in information; 162: password; 200: development-use computer; 201: controller communication part; 202: control program management part; 203: server communication part; 220: control program; 221: execution-use program conversion part; 222: user operation accepting part; 223: encryption key generating part; 224: decryption part; 226: company management part; 227: control program storage part; 228: expiration date management part; 250: maintenance-use computer; 300, 300$a$, 300$b$: controller; 301: communication control part; 302: execution-use control program storage part; 303: internal bus; 304: apparatus identification ID management part; 305: control program execution part; 306: decryption part; 400, 401, 402, 403, 404: communication line; 500: production apparatus; 601: user ID; 602: password; 603: authentication result; 604, 607, 609: apparatus identification ID; 605, 606, 608: apparatus identification ID inquiry message; 611: user ID; 612: password; 614: adjacent PLC information; 640: execution-use control program reading message; 650: edit-use key; 651: execution-use control program; 651$a$: encrypted execution-use control program; 652: execution-use key; 653: developer company information; 661: maintenance company information; 670: expiration date information; 671: current time inquiry message; 673: validity period; 700: time management server; 800, 801, 802: control system; 901: LCD; 902: keyboard; 903: mouse; 904: FDD; 905: CDD; 906: printer; 911: CPU; 912: bus; 913: ROM; 914: RAM; 915: communication board; 920: HDD; 921: operating system; 922: window system; 923: programs; 924: files.

The invention claimed is:
1. A control system comprising:
a control device which executes control of an apparatus;
a program transmission device which converts a source program that describes the control of the apparatus to be executed by the control device, into an execution-use program that can be executed by the control device, encrypts the execution-use program converted, thus generating an encrypted execution-use program, and transmits the encrypted execution-use program generated, to the control device; and
authentication server, the program transmission device including a processor configured to execute instructions to perform functions of
a transmission-side acquisition part which acquires an apparatus identifier that identifies the control device,
a transmission-side accepting part which accepts, from a user, authentication information used for authenticating the user, and
a transmission-side communication part which transmits the authentication information, an edit-use key and the apparatus identifier to the authentication server, and transmits an execution-use key and the encrypted execution-use program to the control device, the edit-use key being used when decrypting the encrypted execution-use program into the execution-use program and converting the execution-use program decrypted, into the source program, the apparatus identifier being acquired by the transmission-side acquisition part, the execution-use key being used when decrypting the encrypted execution-use program into the execution-use program, wherein
the authentication server is configured to receive the edit-use key and the apparatus identifier from the transmission-side communication part, and to store the edit-use key and the apparatus identifier which are received, in correspondence with each other in a storage device, and transmits authentication success information to the program transmission device based on the authentication information,
the control device is configured to receive the execution-use key and the encrypted execution-use program which are transmitted by the transmission-side communication part, and to execute the control of the apparatus by decrypting the execution-use program using the execution-use key, and
after receiving the authentication success information from the authentication part of the authentication server, the program transmission device generates the encrypted execution-use program, and transmits the generated encrypted execution-use program and the execution-use key, to the control device.

2. The control system according to claim 1, wherein:
the transmission-side communication part transmits the authentication information accepted by the transmission-side accepting part to the authentication server,
the authorization server includes a processor configured to perform functions of an authentication part which receives the authentication information transmitted by the transmission-side communication part, determines whether or not to permit access to the program transmission device, based on the authentication information received, and if it is determined that the access to the program transmission device is permitted, transmits the authentication success information to the program transmission device.

3. The control system according to claim 1, further comprising:
a program reception device including a processor configured to perform functions of a reception-side communication part which transmits, to the control device, a read instruction to read the encrypted execution-use program from the control device, wherein
the control device, upon reception of the read instruction from the reception-side communication part, transmits the encrypted execution-use program to the program reception device, the processor in the program reception device is further configured to perform functions of a reception-side acquisition part which acquires the apparatus identifier,
the reception-side communication part transmits the apparatus identifier acquired by the reception-side acquisition part to the authentication server,
the authentication server includes a processer configured to perform functions of an edit-use key acquisition part which, upon reception of the apparatus identifier from the reception-side communication part, acquires the edit-use key corresponding to the apparatus identifier received, based on the apparatus identifier received, and
the processor in the authentication server is further configured to perform functions of a server-side communication part which transmits the edit-use key acquired by the edit-use key acquisition part, to the program reception device,
the reception-side communication part receives the edit-use key transmitted from the server-side communication part and receives the encrypted execution-use program transmitted from the control device based on the read instruction, and
the processor in the program reception device is further configured to perform functions of a reception-side conversion part which, using the edit-use key transmitted by the reception-side communication part, decrypts the encrypted execution-use program received by the reception-side communication part, into the execution-use program and converts the execution-use program decrypted, into the source program.

4. The control system according to claim 3, wherein:
the processor in the program reception device is further configured to perform functions of a reception-side accepting part which accepts, from a user, authentication information used for authenticating the user,
the reception-side communication part transmits the authentication information accepted by the reception-side accepting part to the authentication server and transmits the read instruction to the control device,
the processor in the authentication server is further configured to perform functions of an authentication part which receives the authentication information from the reception-side communication part, determines whether or not to permit access to the program reception device, based on the authentication information received, and if it is determined that the access to the program reception device is permitted, transmits authentication success information to the program reception device, and
when receiving the authentication permission information from the authentication part of the authentication server, the reception-side communication part transmits the apparatus identifier to the authentication server.

5. The control system according to claim 3, further comprising:
a current time management server which manages current time, wherein the processor in the program transmission device is further configured to perform functions of a transmission-side accepting part which accepts input of a validity period of the edit-use key,
the transmission-side communication part further transmits the validity period accepted by the transmission-side accepting part, to the authentication server, and
the authentication server, upon reception of the validity period from the transmission-side communication part, acquires current time from the current time management server, adds the validity period received, to the current time acquired, thus obtaining an expiration date, and stores the expiration date calculated, the edit-use key, and the apparatus identifier in correspondence with each other in a storage device.

6. The control system according to claim 5,
wherein the edit-use key acquisition part of the authentication server,
upon reception of the apparatus identifier from the reception-side communication part, acquires the expiration date corresponding to the apparatus identifier received, acquires current time from the current time management server, determines with a processing device whether or not the current time acquired passes the expiration date, deletes the edit-use key if it is determined that the current time acquired passes the expiration date, and acquires the edit-use key if it is determined that the current time acquired does not pass the expiration date, and
wherein the server-side communication part
transmits the edit-use key acquired by the edit-use key acquisition part to the program reception device.

7. The control system according to claim 1, comprising an adjacent connection device to be connected to the control device,
wherein the transmission-side acquisition part
acquires adjacency information including a connecting relation of the control device and the adjacent connection device, as the apparatus identifier.

8. A program protection method for a control system that includes a control device which executes control of an apparatus, a program transmission device which converts a source program that describes the control of the apparatus to be executed by the control device, into an execution-use program that can be executed by the control device, encrypts the execution-use program converted, thus generating an encrypted execution-use program, and transmits the encrypted execution-use program generated, to the control device, and an authentication server, the program protection method including:

with a transmission-side acquisition part of the program transmission device, acquiring an apparatus identifier that identifies the control device;

with a transmission-side accepting part of the program transmission device, accepting, from a user, authentication information used for authenticating the user;

with a transmission-side communication part of the program transmission device, transmitting the authentication information, an edit-use key and the apparatus identifier to the authentication server, and transmitting an execution-use key and the encrypted execution-use program to the control device, the edit-use key being used when decrypting the encrypted execution-use program into the execution-use program and converting the execution-use program decrypted, into the source program, the apparatus identifier being acquired by the transmission-side acquisition part, the execution-use key being used when decrypting the encrypted execution-use program into the execution-use program;

with the authentication server, receiving the edit-use key and the apparatus identifier which are transmitted from the transmission-side communication part, and storing the edit-use key and the apparatus identifier which are received, in correspondence with each other in a storage device and transmitting authentication success information to the program transmission device based on the authentication information; and with the control device, receiving the execution-use key and the encrypted execution-use program which are transmitted by the transmission-side communication part, and executing the control of the apparatus by decrypting the execution-use program using the execution-use key, and after receiving the authentication success information from the authentication part of the authentication server, generating the encrypted execution-use program at the program transmission device, and transmitting the generated encrypted execution-use program and the execution-use key, to the control device.

\* \* \* \* \*